(12) United States Patent
Jensen et al.

(10) Patent No.: US 8,131,741 B2
(45) Date of Patent: Mar. 6, 2012

(54) CONSTRUCTION, MANIPULATION, AND COMPARISON OF A MULTI-DIMENSIONAL SEMANTIC SPACE

(75) Inventors: Delos C. Jensen, Orem, UT (US); Stephen R. Carter, Spanish Fork, UT (US)

(73) Assignee: Novell Intellectual Property Holdings, Inc., Seattle, WA (US)

( * ) Notice: Subject to any disclaimer, the term of this patent is extended or adjusted under 35 U.S.C. 154(b) by 572 days.

(21) Appl. No.: 11/929,678

(22) Filed: Oct. 30, 2007

(65) Prior Publication Data
US 2008/0052283 A1 Feb. 28, 2008

Related U.S. Application Data

(60) Division of application No. 11/562,337, filed on Nov. 21, 2006, now Pat. No. 7,475,008, which is a continuation of application No. 09/512,963, filed on Feb. 25, 2000, now Pat. No. 7,152,031.

(51) Int. Cl.
*G06F 7/00* (2006.01)
*G06F 17/30* (2006.01)

(52) U.S. Cl. .............. 707/758; 704/9; 704/10
(58) Field of Classification Search ............ None
See application file for complete search history.

(56) References Cited

U.S. PATENT DOCUMENTS

| | | |
|---|---|---|
| 5,276,677 A | 1/1994 | Ramamurthy et al. |
| 5,278,980 A | 1/1994 | Pedersen et al. |
| 5,317,507 A | 5/1994 | Gallant |
| 5,325,298 A | 6/1994 | Gallant |
| 5,325,444 A | 6/1994 | Cass et al. |
| 5,390,281 A | 2/1995 | Luciw et al. |
| 5,412,804 A * | 5/1995 | Krishna .............................. 1/1 |
| 5,499,371 A | 3/1996 | Henninger et al. |
| 5,524,065 A | 6/1996 | Yagasaki |
| 5,539,841 A | 7/1996 | Huttenlocher et al. |
| 5,551,049 A | 8/1996 | Kaplan et al. |
| 5,619,709 A * | 4/1997 | Caid et al. ..................... 715/209 |
| 5,675,819 A | 10/1997 | Schuetze |
| 5,694,523 A | 12/1997 | Wical |

(Continued)

OTHER PUBLICATIONS

"Method and apparatus for semantic characterization of general content streams and repositories", U.S. Appl. No. 09/109,084, filed Jul. 2, 1998 (now U.S. Patent No. 6,108,619).

(Continued)

*Primary Examiner* — Usmaan Saeed
(74) *Attorney, Agent, or Firm* — Marger Johnson & McCollom PC

(57) ABSTRACT

A directed set can be used to establish contexts for linguistic concepts: for example, to aid in answering a question, to refine a query, or even to determine what questions can be answered given certain knowledge. A directed set includes a plurality of elements and chains relating the concepts. One concept is identified as a maximal element. The chains connect the maximal element to each concept in the directed set, and more than one chain can connect the maximal element to any individual concept either directly or through one or more intermediate concepts. A subset of the chains is selected to form a basis for the directed set. Each concept in the directed set is measured to determine how concretely each chain in the basis represents it. These measurements for a single concept form a vector in Euclidean k-space. Distances between these vectors can be used to determine how closely related pairs of concepts are in the directed set.

2 Claims, 21 Drawing Sheets

U.S. PATENT DOCUMENTS

| | | | |
|---|---|---|---|
| 5,696,962 | A | 12/1997 | Kupiec |
| 5,708,825 | A | 1/1998 | Sotomayor |
| 5,721,897 | A | 2/1998 | Rubinstein |
| 5,724,567 | A | 3/1998 | Rose et al. |
| 5,768,578 | A * | 6/1998 | Kirk et al. ............................. 1/1 |
| 5,778,362 | A | 7/1998 | Deerwester |
| 5,778,378 | A | 7/1998 | Rubin |
| 5,778,397 | A | 7/1998 | Kupiec et al. |
| 5,794,178 | A | 8/1998 | Caid et al. |
| 5,799,276 | A | 8/1998 | Komissarchik et al. |
| 5,821,945 | A | 10/1998 | Yeo et al. |
| 5,822,731 | A | 10/1998 | Schultz |
| 5,832,470 | A | 11/1998 | Morita et al. |
| 5,867,799 | A | 2/1999 | Lang et al. |
| 5,873,056 | A | 2/1999 | Liddy et al. |
| 5,873,079 | A | 2/1999 | Davis, III et al. |
| 5,934,910 | A | 8/1999 | Ho et al. |
| 5,937,400 | A * | 8/1999 | Au ................................. 706/55 |
| 5,940,821 | A | 8/1999 | Wical |
| 5,963,965 | A | 10/1999 | Vogel |
| 5,966,686 | A | 10/1999 | Heidorn et al. |
| 5,970,490 | A | 10/1999 | Morgenstern |
| 5,974,412 | A | 10/1999 | Hazlehurst et al. |
| 5,991,713 | A | 11/1999 | Unger et al. |
| 5,991,756 | A | 11/1999 | Wu |
| 6,006,221 | A | 12/1999 | Liddy et al. |
| 6,009,418 | A | 12/1999 | Cooper |
| 6,015,044 | A | 1/2000 | Peterson |
| 6,041,311 | A | 3/2000 | Chislenko et al. |
| 6,076,088 | A * | 6/2000 | Paik et al. .......................... 707/5 |
| 6,078,953 | A | 6/2000 | Vaid et al. |
| 6,085,201 | A | 7/2000 | Tso |
| 6,097,697 | A | 8/2000 | Yao et al. |
| 6,105,044 | A | 8/2000 | De Rose et al. |
| 6,108,619 | A * | 8/2000 | Carter et al. ...................... 704/9 |
| 6,122,628 | A | 9/2000 | Castelli |
| 6,134,532 | A | 10/2000 | Lazarus et al. |
| 6,141,010 | A | 10/2000 | Hoyle |
| 6,173,261 | B1 | 1/2001 | Arai et al. |
| 6,205,456 | B1 | 3/2001 | Nakao |
| 6,263,335 | B1 * | 7/2001 | Paik et al. .......................... 707/5 |
| 6,269,362 | B1 | 7/2001 | Broder et al. |
| 6,289,353 | B1 * | 9/2001 | Hazlehurst et al. .................... 1/1 |
| 6,292,792 | B1 * | 9/2001 | Baffes et al. ...................... 706/45 |
| 6,295,092 | B1 * | 9/2001 | Hullinger et al. ............. 348/468 |
| 6,295,533 | B2 | 9/2001 | Cohen |
| 6,297,824 | B1 | 10/2001 | Hearst et al. |
| 6,311,194 | B1 | 10/2001 | Sheth et al. |
| 6,317,708 | B1 | 11/2001 | Witbrock et al. |
| 6,317,709 | B1 | 11/2001 | Zack |
| 6,356,864 | B1 * | 3/2002 | Foltz et al. ........................ 704/1 |
| 6,363,378 | B1 * | 3/2002 | Conklin et al. ................... 707/5 |
| 6,415,282 | B1 | 7/2002 | Mukherjea et al. |
| 6,446,061 | B1 | 9/2002 | Doerre et al. |
| 6,446,099 | B1 | 9/2002 | Peairs |
| 6,459,809 | B1 | 10/2002 | Jensen et al. |
| 6,460,034 | B1 * | 10/2002 | Wical .................................... 1/1 |
| 6,470,307 | B1 | 10/2002 | Turney |
| 6,493,663 | B1 | 12/2002 | Ueda |
| 6,513,031 | B1 * | 1/2003 | Fries et al. ........................ 707/3 |
| 6,523,026 | B1 | 2/2003 | Gillis |
| 6,606,620 | B1 | 8/2003 | Sundaresan et al. |
| 6,615,208 | B1 | 9/2003 | Behrens et al. |
| 6,615,209 | B1 | 9/2003 | Gomes et al. |
| 6,675,159 | B1 | 1/2004 | Lin et al. |
| 6,732,080 | B1 | 5/2004 | Blants |
| 6,754,873 | B1 | 6/2004 | Law et al. |
| 7,103,609 | B2 | 9/2006 | Elder et al. |
| 7,117,198 | B1 | 10/2006 | Cronin et al. |
| 7,152,031 | B1 * | 12/2006 | Jensen et al. ................... 704/10 |
| 7,286,977 | B1 * | 10/2007 | Carter et al. ...................... 704/9 |
| 7,401,087 | B2 * | 7/2008 | Copperman et al. .......... 707/737 |
| 7,475,008 | B2 * | 1/2009 | Jensen et al. ...................... 704/9 |
| 7,562,011 | B2 * | 7/2009 | Carter et al. ...................... 704/9 |
| 7,949,728 | B2 | 5/2011 | Rivette et al. |
| 2003/0033301 | A1 | 2/2003 | Cheng et al. |
| 2003/0217047 | A1 * | 11/2003 | Marchisio ......................... 707/3 |
| 2004/0122841 | A1 | 6/2004 | Goodman et al. |
| 2004/0254920 | A1 | 12/2004 | Brill et al. |
| 2006/0020593 | A1 | 1/2006 | Ramsaier et al. |
| 2006/0287898 | A1 | 12/2006 | Murashita et al. |
| 2007/0061301 | A1 | 3/2007 | Ramer et al. |
| 2007/0106491 | A1 | 5/2007 | Carter et al. |
| 2007/0233671 | A1 | 10/2007 | Oztekin et al. |
| 2008/0027924 | A1 | 1/2008 | Hamilton et al. |
| 2008/0126172 | A1 | 5/2008 | Melamed et al. |
| 2008/0235189 | A1 | 9/2008 | Rayman et al. |
| 2008/0235220 | A1 | 9/2008 | Chen et al. |
| 2009/0063467 | A1 | 3/2009 | Abhyanker |
| 2010/0082660 | A1 | 4/2010 | Muilenburg et al. |
| 2010/0274815 | A1 | 10/2010 | Vanasco |

OTHER PUBLICATIONS

"Candid Executive Summary"; Nov. 19, 1998; pp. 1-4.

"Methodology"; 1997; pp. 1-5.

Chakrabarti, Soumen, Dom, Byron, Kumar, S. Ravi, Raghavan, Prabhakar, Rajagopalan, Sridhar, and Tomkins, Andrew, "Hypersearching the Web"; Scientific American, Jun. 1999; pp. 54-60.

Chu et al., "Knowledge-Based image retrieval with spatial and temporal constructs"; IEEE; Nov. 1998; pp. 872-888.

Deng, "Ne Tra-V: Toward an object based video representation"; IEEE; Sep. 1998; pp. 616-627.

EPIC Report, "Faulty Filters: How content filters block access to kid-friendly information on the internet"; 1997; pp. 1-8.

Faudemay et al., "Intelligent delivery of personalized video programmes from a video database"; IEEE; 1997; pp. 172-177.

Geiger et al., "Dynamic programming for detecting, tracking, and matching deformable contours"; 1995; pp. 294-302.

Gudivada et al., "Design and evaluation of algorithms for image retrieval by spatial similarity"; 1995; pp. 116-144.

Han et al., "Image organization and retrieval with automatically constructed feature vectors"; 1996.

Hsu et al., "A Knowledge-Based Approach for retrieving images by content", IEEE; Aug. 1996; pp. 522-532.

"Intelligent Collaboration & Visualization"; pp. 1-16.

Jain et al., "Object matching using deformable templates"; IEEE; 1996; pp. 267-278.

Kupeev et al., "On shape similarity"; IEEE; 1994; pp. 227-231.

Liu et al., "Partial shape classification using contour matching in distance transformation"; IEEE; Nov. 1990; pp. 1072-1080.

Mehrotra et al., "Feature based retrieval of similar shapes"; IEEE; 1993; pp. 108-115.

Mehrotra et al., "Similar-shape retrieval in shape data management"; IEEE; 1995; pp. 57-62.

Meier et al., "Segmentation and tracking of moving objects for content-based video coding"; IEEE; Jun. 1999; pp. 144-150.

Mostafa et al., "A Multilevel Approach to Intelligent Information Filtering: Model, System, and Evaluation"; ACM Transactions on Information Systems, vol. 15, No. 4; Oct. 1997; pp. 368-399.

Nes et al., "Region-based indexing in an image database"; 1997; pp. 1-9.

Ozer et al., "A graph based object description for information retrieval in digital image and video libraries"; IEEE; Jun. 22, 1999; pp. 1-4.

Ravela et al., "Retrieving images by similarity of visual appearance", IEEE; 1997; pp. 67-74.

Saber et al., "Integration of color, shape and texture for image annotation and retrieval"; IEEE; 1996; pp. 851-854.

Smith et al., "Searching for images and videos on the world-wide web"; 1996; 25 pp. 1-20.

Vapillon et al., "Analyzing and filtering contour deformation"; IEEE; 1998; pp. 267-271.

Wired News, "SurfWatch Allowed Key Patent"; Nov. 16, 1998, pp. 1-3.

Yang et al., "A similarity measure of deformable shapes"; IEEE; 1997; pp. 1455-1459.

Bartell et al.; "Latent Semantic Indexing is an Optimal Special Case of Multidimensional Scaling"; Dept. of Computer Science and Engineering, University of California, San Diego; 1992; 7 Pages.

Chomsky, Noam; "Language and Thought"; 1993; pp. 18-19, 22-27, 44-45, 60-61.
Chomsky, Noam; "The Minimalist Program"; 1995; pp. 13-65.
Cook et al.; "Chomsky's Universal Grammar—An Introduction"; 1988, pp. 40-74, 131-272.
Culler; "Ferdinand de Saussure—Revised Edition"; 1986; pp. 38-57.
Eco et al.; "Meaning and Mental Representations"; 1988, p. 221.
Eco; "Semiotics and the Philosophy of Language"; 1984; pp. 46-86.
Edwards; "Functional Analysis: Theory and Applications"; 1965; pp. 10-13, 32-33, 50-53, 62-65, 88-103, 174-203, 224-233.
Halmos; "Naive Set Theory"; Undergraduate Texts in Mathematics; 1968; pp. 56-57, 66-69.
Hocking et al.; "Topology"; 1961; pp. 6-7, 56-59, 68-71.
Hutson; "Applications of Functional Analysis and Operator Theory"; 1980; Index, Preface, and Table of Contents.
Kahn; "Topology: An Introduction to the Point-Set and Algebraic Areas"; 1975; pp. 10-15.
Khare et al.; "Capturing the State of Distributed Systems with XML"; Oct. 26, 1997; pp. 1-12.
Lundquist et al.; "Improving Relevance Feedback in the Vector Space Model"; 1997; pp. 16-23.
Mahesh; "Ontology Development for Machine Translation"; Ideology and Methodology, Technical Report, Computing Research Laboratory; 1996; pp. 1-79.
Mostafa et al.; "A Multilevel Approach to Intelligent Information Filtering: Model, System and Evaluation"; ACM Transactions on Information Systems; vol. 15, No. 5; Apr. 1998; pp. 90-92.
Onyshkevych et al.; "A Lexicon for Knowledge-Based MT"; U.S. Department of Defense and Carnegie Mellon University; 1995; pp. 1-49.
Pesetsky; "Zero Syntax: Experiencers and Cascades"; 1995; pp. 1-122.
Pejtersen; "Semantic Information Retrieval"; Communications of the ACM; vol. 41, No. 5; Apr. 1998; pp. 90-92.
"Platform for Internet Content Selection (PICS)"; http://www.w3.org; pp. 1-8.
Singh; "Unifying Heterogeneous Information Models"; Tesserae Information Systems, Inc.; http://citeseer.ist.psu.edu.com; pp. 1-13.
Smith; "Computers and Human Language"; 1991, pp. 205-257.
"WordNet—A Lexical Database for the English Language"; Cognitive Science Laboratory, Princeton University; http://www.cogsci.princeton.edu; pp. 1-2.
Chomsky, Noam, "The Minimalist Program"; 1995; pp. 13-127.
Aman et al., "Identifying Expressions of Emotion in Text", TSD 2007, LNAI 4629, pp. 196-205.
Hsu et al., "A Knowledge-Based Approach for retrieving images by content", IEEE; Aug. 1996; pp. 522-532.
Mehrotra et al., "Similar-shape retrieval in shape data management"; IEEE; 1995; pp. 57-62.
Neviarouskaya et al., "Narrowing the Social Gap among People Invoiced in Global Dialogue: Automatic Emotion Detection in Blog Posts", ICWSM, 2007 (2 pages).
Schneier, B., "Anonymity and the Netflix Database", retrieved from http://www.schneier.com/blog/archives/2007/12; Dec. 18, 2007 (2 pages).
Schneier, B., "Why Anonymous Data Sometimes Isn't", retrieved from http://www.wired.com/politics/security/commentary/securitymatters/2007/12/securitymatters_1213; Dec. 13, 2007 (3 pages).
Bartell, et al., "Latent Semantic Indexing is an Optimal Special Case of Multidimensional Scaling"; Dept. of Computer Science & Engineering; University of California, San Diego; 1992; 7 pages.

* cited by examiner

CONSTRUCTION, MANIPULATION, AND COMPARISON OF A MULTI-DIMENSIONAL SEMANTIC SPACE

RELATED APPLICATION DATA

This application is a divisional of U.S. patent application Ser. No. 11/562,337, filed en-Nov. 21, 2006, now U.S. Pat. No. 7,475,008, issued Jan. 6, 2009, which is a continuation of U.S. patent application Ser. No. 09/512,963, filed Feb. 25, 2000, now U.S. Pat. No. 7,152,031, issued Dec. 19, 2006, which is related to U.S. patent application Ser. No. 09/109,804, titled "METHOD AND APPARATUS FOR SEMANTIC CHARACTERIZATION," filed Jul. 2, 1998, now U.S. Pat. No. 6,108,619, issued Aug. 22, 2000, which is hereby incorporated by reference for all purposes.

FIELD OF THE INVENTION

This invention pertains to determining the semantic content of a network, and more particularly to improving searching of the network.

BACKGROUND OF THE INVENTION

The Internet is about content. Content being accessed, published, indexed, analyzed, secured, purchased, stolen, vandalized, etc. Whether the content is white-papers, on-line books, catalogs, real-time games, address books, streaming audio and video, etc., it is content that people and cyber-agents are seeking. The future of the Internet lies not in bandwidth or capacity, but rather the ability to retrieve relevant content. Technology that allows fast and accurate access to relevant content will be used by the masses of carbon and silicon Internet users. Not because it is a better mouse-trap, but because controlled access to relevant content will allow the Internet to thrive, survive, and continue its explosive growth. Fast and accurate semantic access to Internet content will determine who rules the next Internet era.

Caught between the sheer (and ever growing) volume of content, the huge and rapidly increasing number of Internet users, and a growing sophistication in the demands of those users, the current TCP/IP infrastructure and architecture is showing its inadequacies—it is a victim of its own success. One of the many strategies under consideration by the Internet community for redressing these inadequacies is to build intelligence into the network. Directory Services and Caching are two prime examples of intelligent network components. Adaptive routing with route caching is another example of an intelligent network component.

Yet another example of network intelligence that is receiving close attention these days is the characterization of content by its meaning (semantics). The obvious advantages that accrue with even a moderately successful semantic characterization component are such that almost everyone is tempted to dip a toe in the water. But assigning semantics to information on the Internet is the kind of undertaking that consumes vast amounts of resources.

Accordingly, a need remains for a way to assign semantic meaning to data without consuming large quantities of resources, and for a way to improve semantic understanding as information develops.

SUMMARY OF THE INVENTION

To find a context in which to answer a question, a directed set is constructed. The directed set comprises a plurality of elements and chains relating the concepts. One concept is identified as a maximal element. Chains are established in the directed set, connecting the maximal element to each concept in the directed set. More than one chain can connect the maximal element to each concept. A subset of the chains is selected to form a basis for the directed set. Each concept in the directed set is measured to determine how concretely each chain in the basis represents it. These measurements can be used to determine how closely related pairs of concepts are in the directed set.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1A:
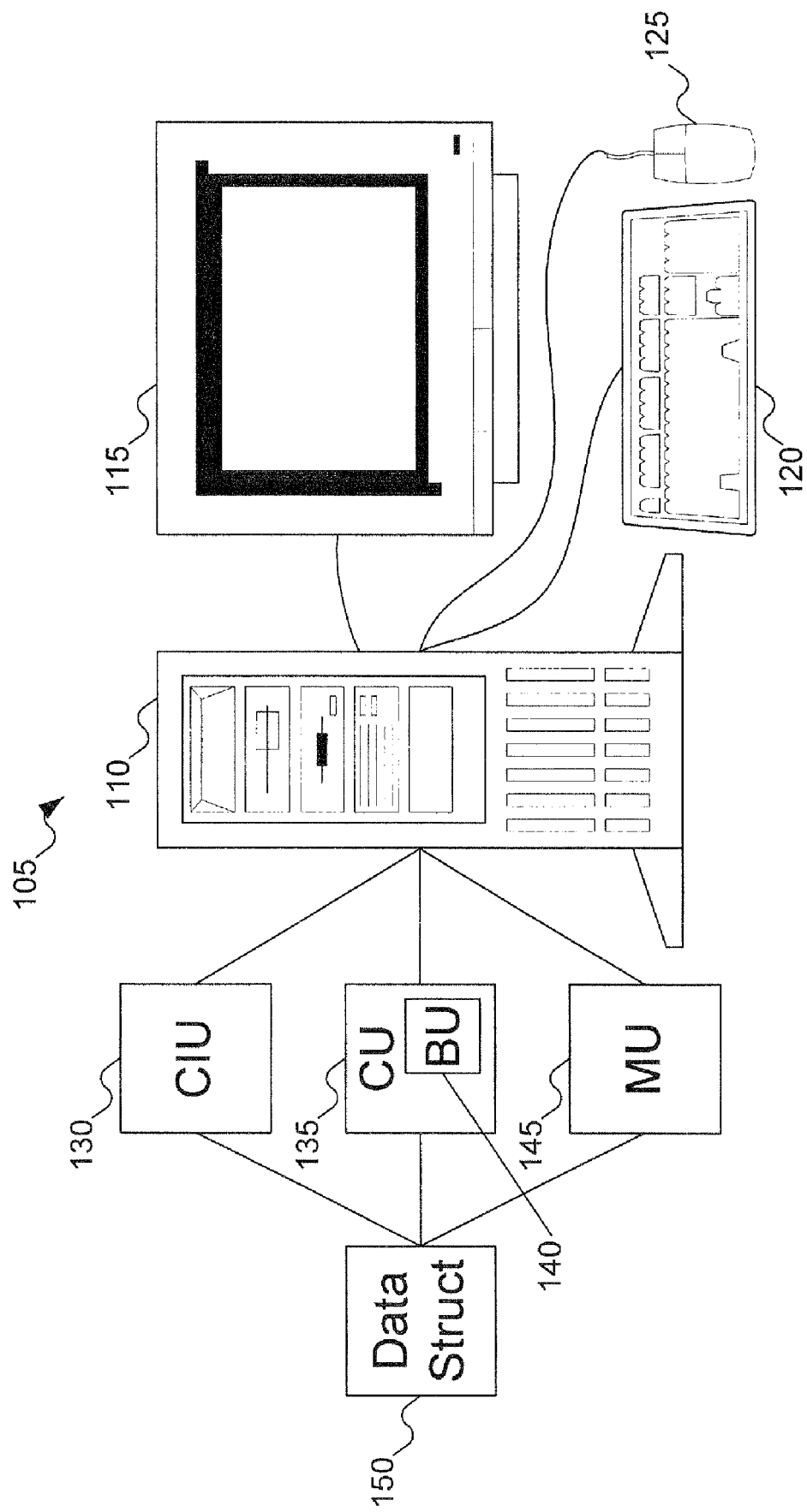
FIG. 1A shows a computer system on which the invention can operate.

FIG. 1A shows a computer system 105 on which a method and apparatus for using a multi-dimensional semantic space can operate. Computer system 105 conventionally includes a computer 110, a monitor 115, a keyboard 120, and a mouse 125. Optional equipment not shown in FIG. 1A can include a printer and other input/output devices. Also not shown in FIG. 1A are the conventional internal components of computer system 105: e.g., a central processing unit, memory, file system, etc.

Computer system 105 further includes a concept identification unit (CIU) 130, a chain unit (CU) 135, a basis unit (BU) 140, and a measurement unit (MU) 145. Concept identification unit 130 is responsible for identifying the concepts that will form a directed set, from which the multi-dimensional semantic space can be mapped. One concept is identified as a maximal element: this element describes (more or less concretely) every concept in the directed set. Chain unit 135 is responsible for constructing chains from the maximal element to all other concepts identified by concept identification unit 130. Basis unit 140 is responsible for selecting a subset of the chains to form a basis for the directed set. Because basis unit 140 selects a subset of the chains established by chain unit 135, basis unit 140 is depicted as being part of chain unit 135. However, a person skilled in the art will recognize that basis unit 140 can be separate from chain unit 135. Measurement unit 145 is responsible for measuring how concretely each chain in the basis represents each concept. (How this measurement is performed is discussed below.) In the preferred embodiment, concept identification unit 130, chain unit 135, basis unit 140, and measurement unit 145 are implemented in software. However, a person skilled in the art will recognize that other implementations are possible. Finally, computer system 105 includes a data structure 150 (discussed with reference to FIG. 13 below). The data structure is responsible for storing the concepts, chains, and measurements of the directed set.

Figure 1B:
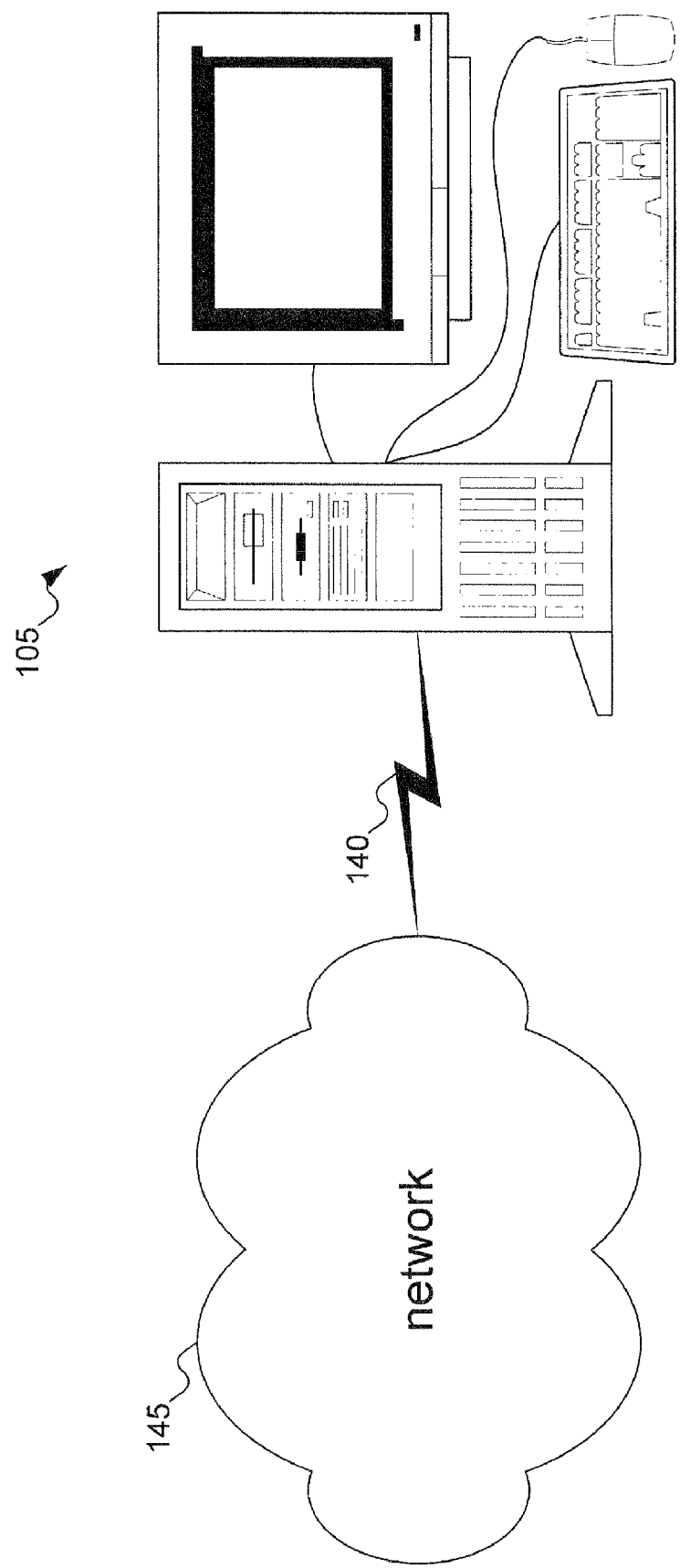
FIG. 1B shows the computer system of FIG. 1A connected to the Internet.

FIG. 1B shows computer system 105 connected over a network connection 140 to a network 145. The specifics of network connection 140 are not important, so long as the invention has access to a content stream to listen for concepts and their relationships. Similarly, computer system 105 does not have to be connected to a network 145, provided some content stream is available.

Figure 2:
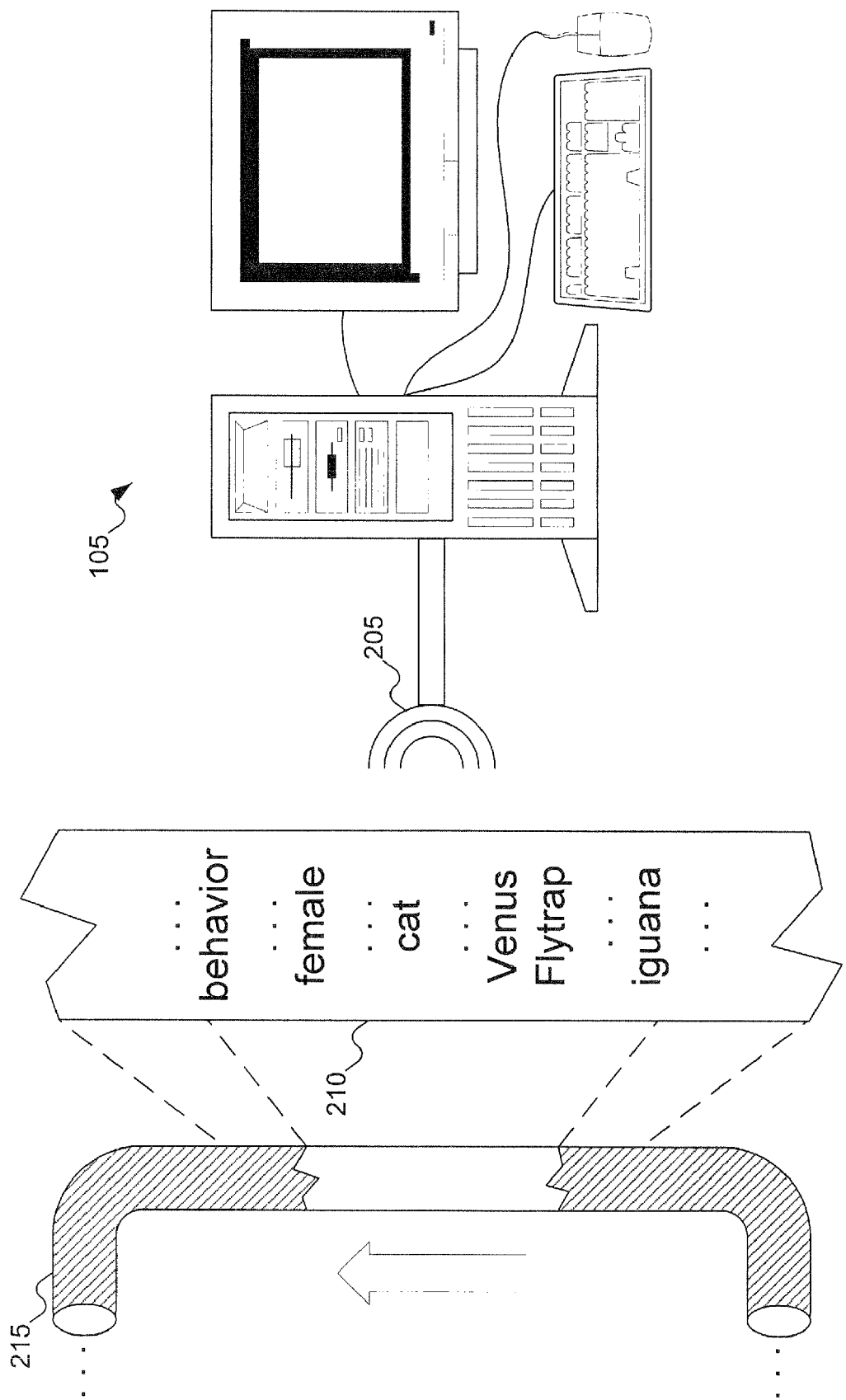
FIG. 2 shows the computer system of FIG. 1A listening to a content stream.

FIG. 2 shows computer system 105 listening to a content stream. In FIG. 2, network connection 140 includes a listening device 205. Listening device 205 (sometimes called a "listening mechanism") allows computer system 105 to listen to the content stream 210 (in FIG. 2, represented as passing through a "pipe" 215). Computer system 105 is parsing a number of concepts, such as "behavior," "female," "cat," "Venus Flytrap," "iguana," and so on. Listening device 205 also allows computer system 105 to determine the relationships between concepts.

But how is a computer, such as computer system 105 in FIGS. 1A, 1B, and 2 supposed to understand what the data it hears means? This is the question addressed below.

Semantic Value

Whether the data expressing content on the network is encoded as text, binary code, bit map or in any other form, there is a vocabulary that is either explicitly (such as for code) or implicitly (as for bitmaps) associated with the form. The vocabulary is more than an arbitrarily-ordered list: an element of a vocabulary stands in relation to other elements, and the "place" of its standing is the semantic value of the element. For example, consider a spoon. Comparing the spoon with something taken from another scene—say, a shovel—one might classify the two items as being somewhat similar. And to the extent that form follows function in both nature and human artifice, this is correct! The results would be similar if the spoon were compared with a ladle. All three visual elements—the spoon, the shovel, and the ladle—are topologically equivalent; each element can be transformed into the other two elements with relatively little geometric distortion.

What happens when the spoon is compared with a fork? Curiously enough, both the spoon and the fork are topologically equivalent. But comparing the ratio of boundary to surface area reveals a distinct contrast. In fact, the attribute (boundary)/(surface area) is a crude analog of the fractal dimension of the element boundary.

Iconic Representation

Fractal dimension possesses a nice linear ordering. For example, a space-filling boundary such as a convoluted coastline (or a fork!) would have a higher fractal dimension than, say, the boundary of a circle. Can the topology of an element be characterized in the same way? In fact, one can assign a topological measure to the vocabulary elements, but the measure may involve aspects of homotopy and homology that preclude a simple linear ordering. Suppose, for visual simplicity, that there is some simple, linearly ordered way of measuring the topological essence of an element. One can formally represent an attribute space for the elements, where fork-like and spoon-like resolve to different regions in the attribute space. In this case, one might adopt the standard Euclidean metric for $R^2$ with one axis for "fractal dimension" and another for "topological measure," and thus have a well-defined notion of distance in attribute space. Of course, one must buy into all the hidden assumptions of the model. For example, is the orthogonality of the two attributes justified, i.e., are the attributes truly independent?

The example attribute space is a (simplistic) illustration of a semantic space, also known as a concept space. Above, the concern was with a vocabulary for human visual elements: a kind of visual lexicon. In fact, many researchers have argued for an iconic representation of meaning, particularly those looking for a representation unifying perception and language. They take an empirical positivist position that meaning is simply an artifact of the "binding" of language to perception, and point out that all writing originated with pictographs (even the letter "A" is just an inverted ox head!). With the exception of some very specialized vocabularies, it is an unfortunate fact that most iconic models have fallen well short of the mark. What is the visual imagery for the word "maybe"? For that matter, the above example iconic model has shown how spoons and forks are different, but how does it show them to be the same (i.e., cutlery)?

Propositional Representation

Among computational linguists, a leading competitive theory to iconic representation is propositional representation. A proposition is typically framed as a pairing of an argument and a predicate. For example, the fragment "a red car" could be represented prepositionally as the argument "a car" paired with the predicate "is red." The proposition simply asserts a property (the predicate) of an object (the argument). In this example, stipulating the argument alone has consequences; "a car" invokes the existential quantifier, and asserts instances for all relevant primitive attributes associated with the lexical element "car."

How about a phrase such as "every red car"? Taken by itself, the phrase asserts nothing—not even existence! It is a null proposition, and can be safely ignored. What about "every red car has a radio"? This is indeed making an assertion of sorts, but it is asserting a property of the semantic space itself. i.e., it is a meta-proposition. One can not instantiate a red car without a radio, nor can one remove a radio from a red car without either changing the color or losing the "car-ness" of the object. Propositions that are interpreted as assertions rather than as descriptions are called "meaning postulates."

At this point the reader should begin to suspect the preeminent role of the predicate, and indeed would be right to do so. Consider the phrase, "the boy hit the baseball."

nominative: the boy→(is human), (is ~adult), (is male), (is ~infant), etc.

predicate: (hit the baseball)→ verb: hit→(is contact), (is forceful), (is aggressive), etc.

d.o.: the baseball→(is round), (is leather), (is stitched), etc.

The phrase has been transformed into two sets of attributes: the nominative attributes and two subsets of predicate attributes (verb and object). This suggests stipulating that all propositions must have the form (n: n E N, p: p E P), where N (the set of nominatives) is some appropriately restricted subset of $\wp$ (P) (the power set of the space P of predicates). N is restricted to avoid things like ((is adult) and (is adult)). In this way the predicates can be used to generate a semantic space. A semantic representation might even be possible for something like, "The movie The Boy Hit the Baseball hit this critic's heart-strings!"

Given that propositions can be resolved to sets of predicates, the way forward becomes clearer. If one were to characterize sets of predicates as clusters of points in an attribute space along with some notion of distance between clusters, one could quantify how close any two propositions are to each other. This is the Holy Grail.

Before leaving this section, observe that another useful feature of the propositional model is hierarchy of scope, at least at the sentence level and below. Consider the phrase, "the boy hit the spinning baseball." The first-tier proposition is "x hit y." The second-tier propositions are "x is-a boy," and "y is-a baseball." The third-tier proposition is "y is spinning." By restricting the scope of the semantic space, attention can be focused on "hitting," "hitting spinning things," "people hitting things," etc.

Hyponymy & Meaning Postulates—Mechanisms for Abstraction

Two elements of the lexicon are related by hyponymy if the meaning of one is included in the meaning of the other. For example, the words "cat" and "animal" are related by hyponymy. A cat is an animal, and so "cat" is a hyponym of "animal."

A particular lexicon may not explicitly recognize some hyponymies. For example, the words "hit," "touch," "brush," "stroke," "strike," and "ram" are all hyponyms of the concept "co-incident in some space or context." Such a concept can be formulated as a meaning postulate, and the lexicon is extended with the meaning postulate in order to capture formally the hyponymy.

Note that the words "hit" and "strike" are also hyponyms of the word "realize" in the popular vernacular. Thus, lexical elements can surface in different hyponymies depending on the inclusion chain that is followed.

Topological Considerations

Now consider the metrization problem: how is the distance between two propositions determined? Many people begin by identifying a set S to work with (in this case, S=P, the set of predicates), and define a topology on S. A topology is a set O of subsets of S that satisfies the following criteria:

Any union of elements of O is in O.
Any finite intersection of elements of O is in O.
S and the empty set are both in O.

The elements of O are called the open sets of S. If X is a subset of S, and p is an element of S, then p is called a limit point of X if every open set that contains p also contains a point in X distinct from p.

Another way to characterize a topology is to identify a basis for the topology. A set B of subsets of S is a basis if S=the union of all elements of B,
for $p \in b_\alpha \cap b_\gamma$, ($b_\alpha$, $b_\gamma \in B$), there exists $b_\lambda \in B$ such that $p \in b_\lambda$ and $b_\lambda \supset b_\alpha \cap b_\gamma$.

A subset of S is open if it is the union of elements of B. This defines a topology on S. Note that it is usually easier to characterize a basis for a topology rather than to explicitly identify all open sets. The space S is said to be completely separable if it has a countable basis.

It is entirely possible that there are two or more characterizations that yield the same topology. Likewise, one can choose two seemingly closely-related bases that yield non-equivalent topologies. As the keeper of the Holy Grail said to Indiana Jones, "Choose wisely!"

The goal is to choose as strong a topology as possible. Ideally, one looks for a compact metric space. One looks to satisfy separability conditions such that the space S is guaranteed to be homeomorphic to a subspace of Hilbert space (i.e., there is a continuous and one-to-one mapping from S to the subspace of Hilbert space). One can then adopt the Hilbert space metric. Failing this, as much structure as possible is imposed. To this end, consider the following axioms (the so-called "trennungaxioms").

$T_0$. Given two points of a topological space S, at least one of them is contained in an open set not containing the other.

$T_1$. Given two points of S, each of them lies in an open set not containing the other.

$T_2$. Given two points of S, there are disjoint open sets, each containing just one of the two points (Hausdorff axiom).

$T_3$. If C is a closed set in the space S, and if p is a point not in C, then there are disjoint open sets in S, one containing C and one containing p.

$T_4$. If H and K are disjoint closed sets in the space S, then there are disjoint open sets in S, one containing H and one containing K.

Note that a set X in S is said to be closed if the complement of X is open. Since the intention is not to take the reader through the equivalent of a course in topology, simply observe that the distinctive attributes of $T_3$ and $T_4$ spaces are important enough to merit a place in the mathematical lexicon—$T_3$ spaces are called regular spaces, and $T_4$ spaces are called normal spaces—and the following very beautiful theorem:

Theorem 1. Every completely separable regular space can be imbedded in a Hilbert coordinate space.

So, if there is a countable basis for S that satisfies $T_3$, then S is metrizable. The metrized spaced S is denoted as (S, d).

Finally, consider $(\mathcal{H}(\mathbf{S}))$, the set of all compact (non-empty) subsets of (S, d). Note that for u, $v \in (\mathcal{H}(\mathbf{S}))$, $u \cup v \in (\mathcal{H}(\mathbf{S}))$; i.e., the union of two compact sets is itself compact. Define the pseudo-distance $\xi(x, u)$ between the point $x \in S$ and the set $u \in (\mathcal{H}(\mathbf{S}))$ as $$\xi(x,u)=\min\{d(x,y):y \in u\}.$$

Using $\xi$ define another pseudo-distance $\lambda(u, v)$ from the set $u \in (\mathcal{H}(\mathbf{S}))$ to the set $v \in (\mathcal{H}(\mathbf{S}))$:

$$\lambda(u,v)=\max\{\xi(x,v):x \in u\}.$$

Note that in general it is not true that $\lambda(u, v)=\lambda(v, u)$. Finally, define the distance $h(u, v)$ between the two sets u, $v \in (\mathcal{H}(\mathbf{S}))$ as $$h(u,v)=\max\{\lambda(u,v),\lambda(v,u)\}.$$

The distance function h is called the Hausdorff distance. Since h(u, v)=h(v, u),
$0 < h(u, v) < \infty$ for all u, $v \in (\mathcal{H}(\mathbf{S}))$, $u \neq v$,
h(u, u)=0 for all $u \in (\mathcal{H}(\mathbf{S}))$,
$h(u, v) \leq h(u, w)+h(w, v)$ for all u, v, $w \in (\mathcal{H}(\mathbf{S}))$, the metric space $((\mathcal{H}(\mathbf{S})), h)$ can now be formed. The completeness of the underlying metric space (S, a) is sufficient to show that every Cauchy sequence $\{u_k\}$ in $((\mathcal{H}(\mathbf{S})), h)$ converges to a point in $((\mathcal{H}(\mathbf{S})), h)$. Thus, $((\mathcal{H}(\mathbf{S})), h)$ is a complete metric space.

If S is metrizable, then it is ($\mathcal{H}(S)$, h) wherein lurks that elusive beast, semantic value. For, consider the two propositions, $\rho_1 = (n_i, p_1)$, $\rho_2 = (n_2, p_2)$. Then the nominative distance $|n_2 - n_1|$ can be defined as $h(\overline{n_1}, \overline{n_2})$, where n denotes the closure of n. The predicate distance can be defined similarly. Finally, one might define:

$$|\rho_2 - \rho_1| = (|n_2 - n_1|^2 + |p_2 - p_1|^2)^{1/2} \quad \text{Equation (1a)}$$

or alternatively one might use "city block" distance:

$$|\rho_2 - \rho_1| = |n_2 - n_1| + \beta |p_2 - p_1| \quad \text{Equation (1b)}$$

as a fair approximation of distance. Those skilled in the art will recognize that other metrics are also possible: for example:

$$(\tau(\rho_{2,i} - \rho_{1,i})^n)^{1/n} \quad \text{Equation (1c)}$$

The reader may recognize ($\mathcal{H}(S)$, h) as the space of fractals. Some compelling questions come immediately to mind. Might one be able to find submonoids of contraction mappings corresponding to related sets in ($\mathcal{H}(S)$, h); related, for example, in the sense of convergence to the same collection of attractors? This could be a rich field to plow.

An Example Topology

Consider an actual topology on the set P of predicates. This is accomplished by exploiting the notion of hyponymy and meaning postulates.

Let P be the set of predicates, and let B be the set of all elements of $2^2$, i.e., $\wp(\wp(P))$, that express hyponymy. B is a basis, if not of $2^P$, i.e., $\wp(P)$, then at least of everything worth talking about: $S = \cup(b: b \in B)$. If $b_\alpha$, $b_\gamma \in B$, neither containing the other, have a non-empty intersection that is not already an explicit hyponym, extend the basis B with the meaning postulate $b_\alpha \cap b_\gamma$. For example, "dog" is contained in both "carnivore" and "mammal." So, even though the core lexicon may not include an entry equivalent to "carnivorous mammal," it is a worthy meaning postulate, and the lexicon can be extended to include the intersection. Thus, B is a basis for S.

Because hyponymy is based on nested subsets, there is a hint of partial ordering on S. A partial order would be a big step towards establishing a metric.

Figure 3:
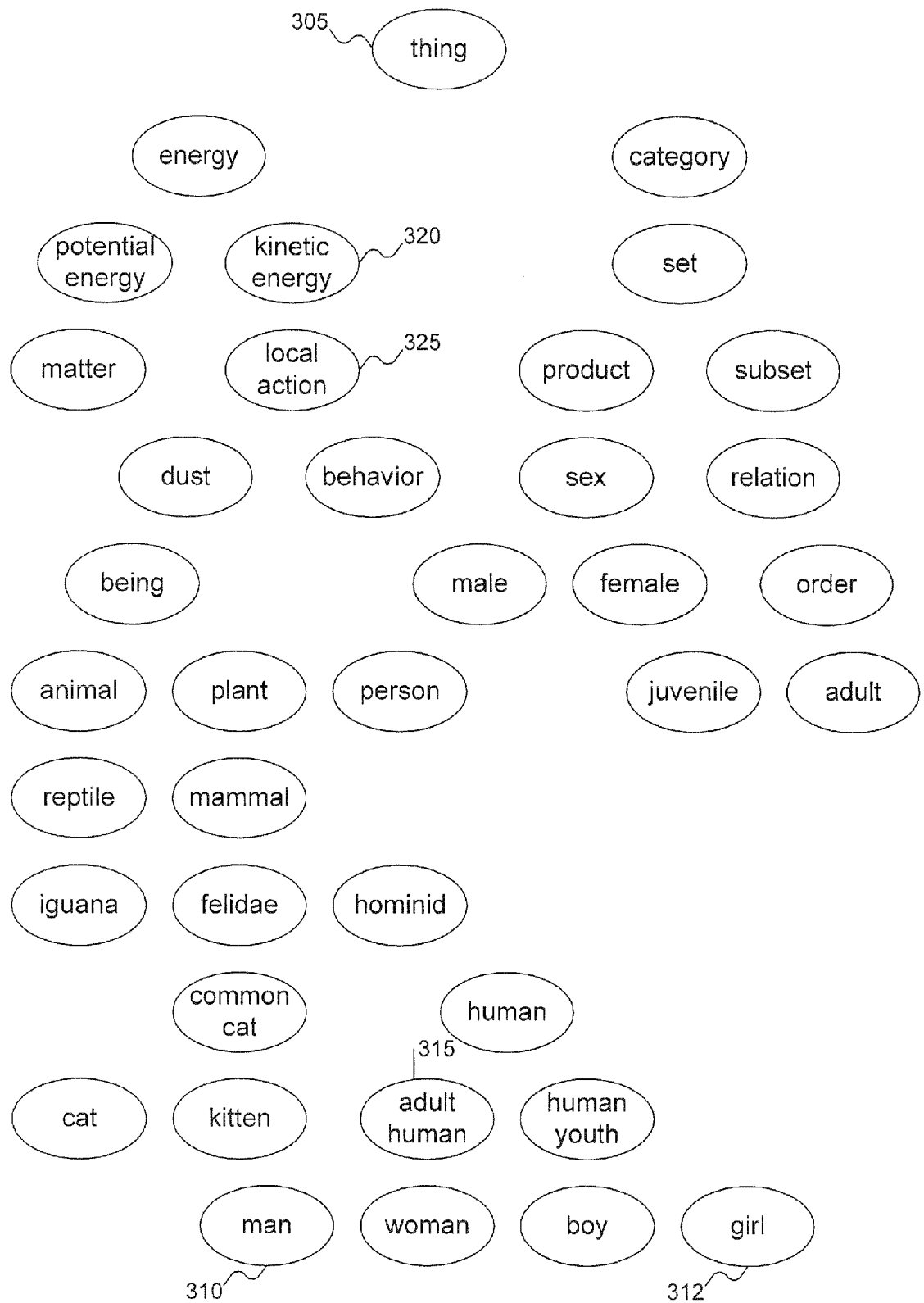
FIG. 3 shows an example of set of concepts that can form a directed set.

At this point, a concrete example of a (very restricted) lexicon is in order. FIG. 3 shows a set of concepts, including "thing" 305, "man" 310, "girl" 312, "adult human" 315, "kinetic energy" 320, and "local action" 325. "Thing" 305 is the maximal element of the set, as every other concept is a type of "thing." Some concepts, such as "man" 310 and "girl" 312 are "leaf concepts," in the sense that no other concept in the set is a type of "man" or "girl." Other concepts, such as "adult human" 315, "kinetic energy" 320, and "local action" 325 are "internal concepts," in the sense that they are types of other concepts (e.g., "local action" 325 is a type of "kinetic energy" 320 but there are other concepts that are types of these concepts (e.g., "man" 310 is a type of "adult human" 315).

Figure 4:
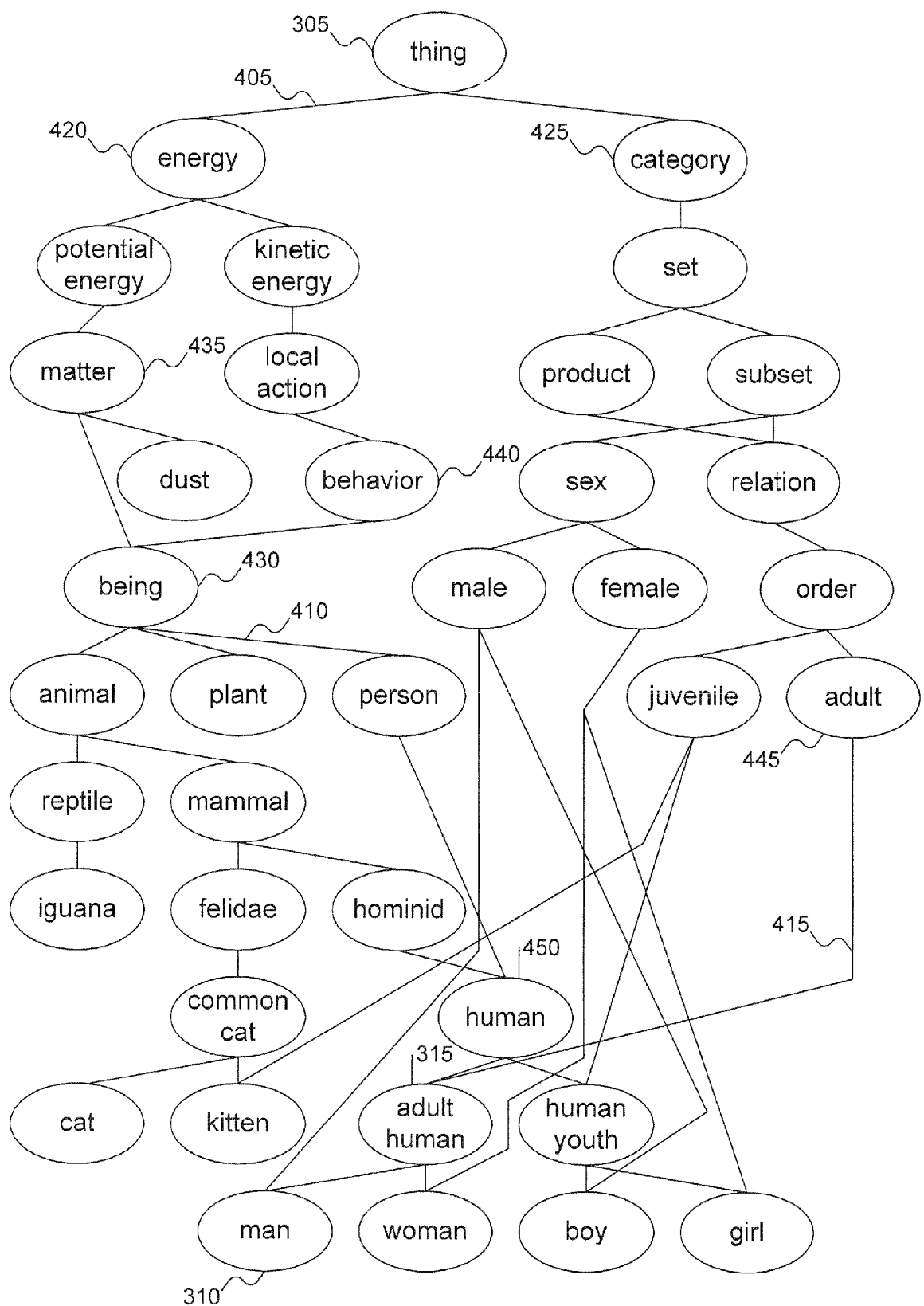
FIG. 4 shows a directed set constructed from the set of concepts of FIG. 3 in a preferred embodiment of the invention.

FIG. 4 shows a directed set constructed from the concepts of FIG. 3. For each concept in the directed set, there is at least one chain extending from maximal element "thing" 305 to the concept. These chains are composed of directed links, such as links 405, 410, and 415, between pairs of concepts. In the directed set of FIG. 4, every chain from maximal element "thing" must pass through either "energy" 420 or "category" 425. Further, there can be more than one chain extending from maximal element "thing" 305 to any concept. For example, there are four chains extending from "thing" 305 to "adult human" 315: two go along link 410 extending out of "being" 435, and two go along link 415 extending out of "adult" 445.

As should be clear, for any given directed link, one of the concepts is the source of the directed link, and the other directed link is the destination (or sink) of the directed link.

In a chain, for any pair of concepts, one concept is closer to the maximal element than the other; the concept closer to the maximal element can be considered a lineal ancestor of the other concept. (Conversely, the second concept can be considered a lineal descendant of the first concept.) The maximal element is, by definition, closer to itself than any of the other concepts; therefore, the maximal element can be thought of as a lineal ancestor of all other concepts in the directed set (and all other concepts in the directed set can be considered lineal descendants of the maximal element).

Some observations about the nature of FIG. 4:

First, the model is a topological space.

Second, note that the model is not a tree. In fact, it is an example of a directed set. For example, concepts "being" 430 and "adult human" 315 are types of multiple concepts higher in the hierarchy. "Being" 430 is a type of "matter" 435 and a type of "behavior" 440; "adult human" 315 is a type of "adult" 445 and a type of "human" 450.

Third, observe that the relationships expressed by the links are indeed relations of hyponymy.

Fourth, note particularly—but without any loss of generality—that "man" 310 maps to both "energy" 420 and "category" 425 (via composite mappings) which in turn both map to "thing" 305; i.e., the (composite) relations are multiple valued and induce a partial ordering. These multiple mappings are natural to the meaning of things and critical to semantic characterization.

Finally, note that "thing" 305 is maximal; indeed, "thing" 305 is the greatest element of any quantization of the lexical semantic field (subject to the premises of the model).

Metrizing S

Figure 5A:
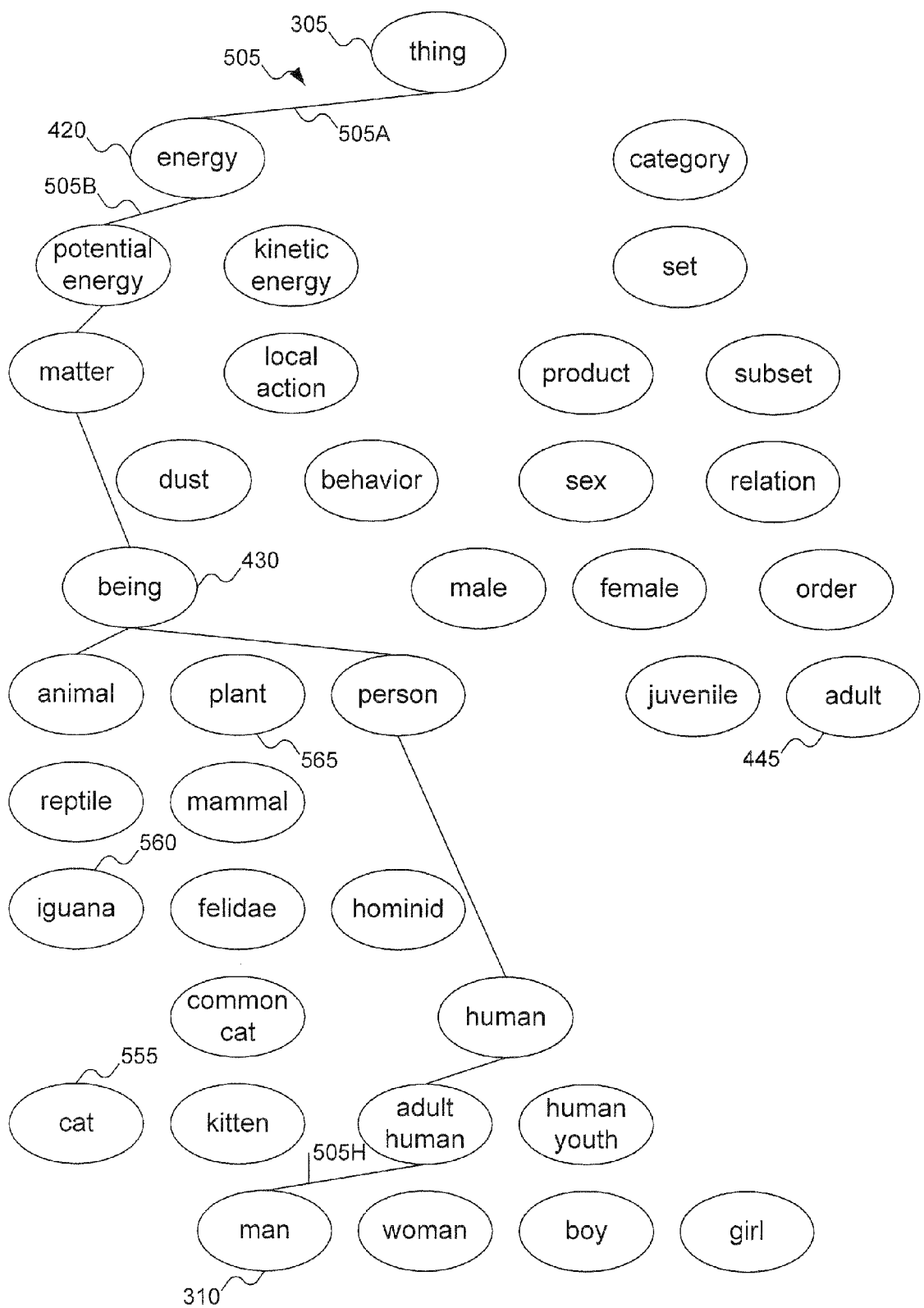
FIGS. 5A-5G show eight different chains in the directed set of FIG. 4 that form a basis for the directed set.
Figure 5B:
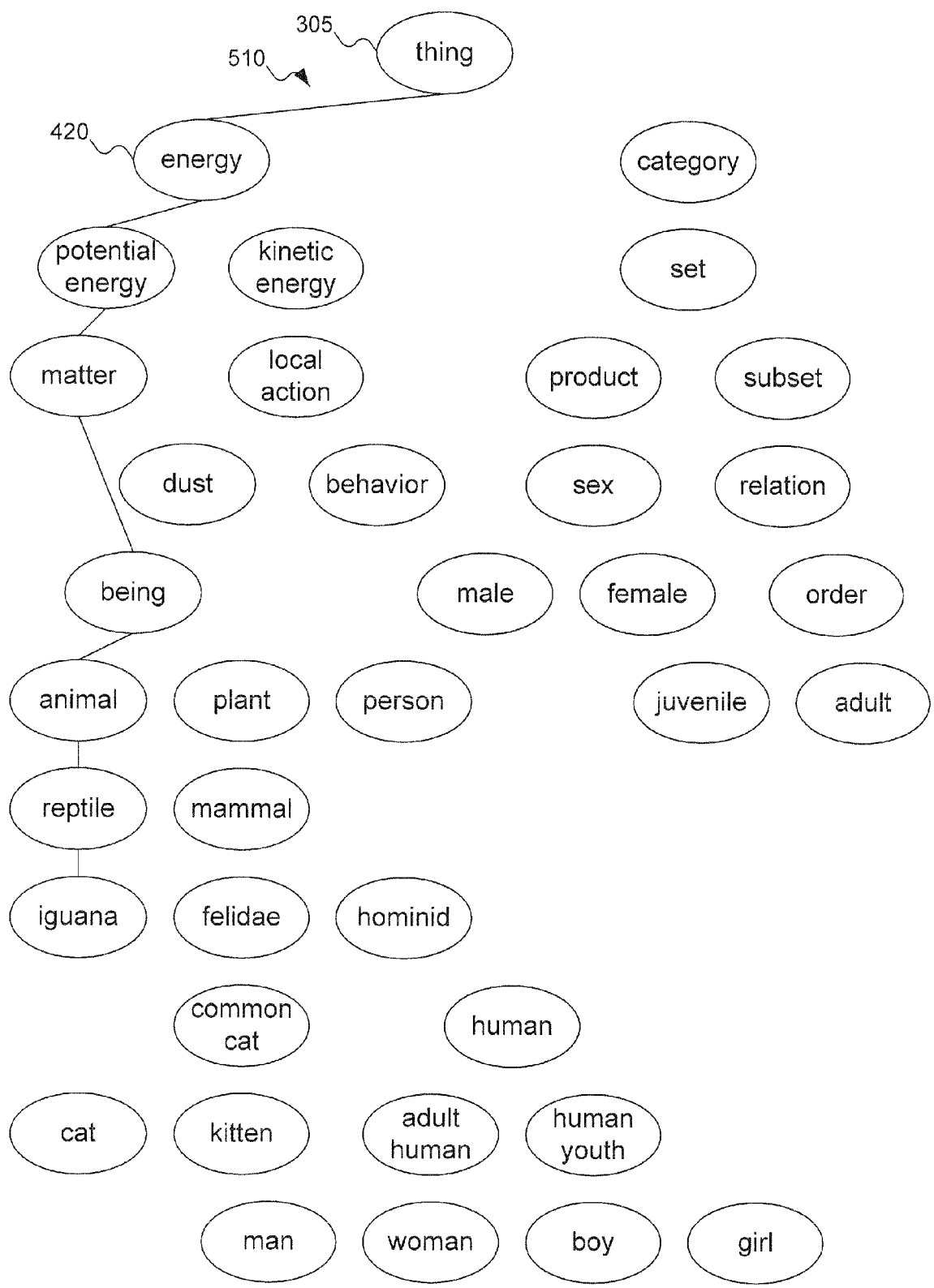
Figure 5C:
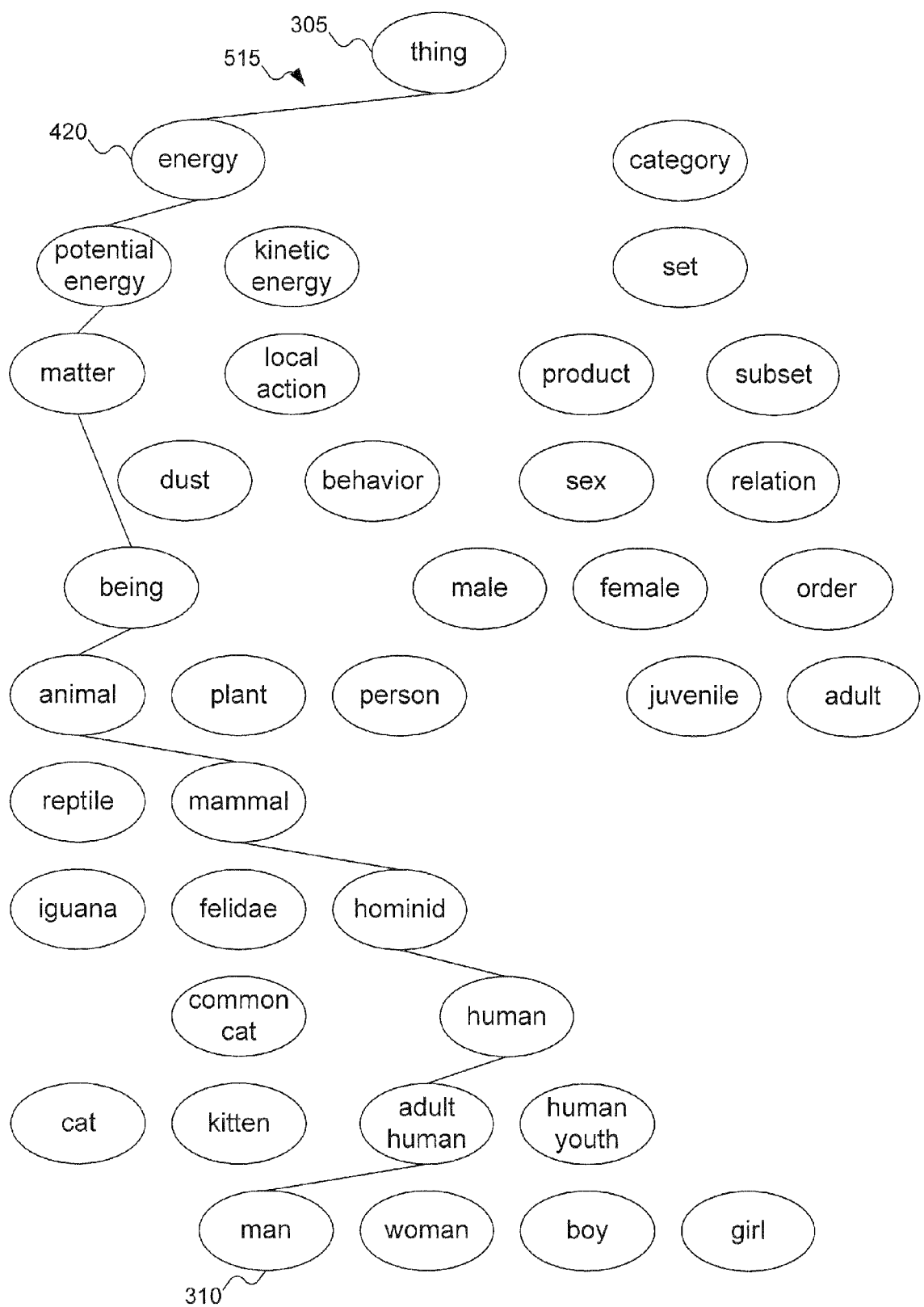
Figure 5D:
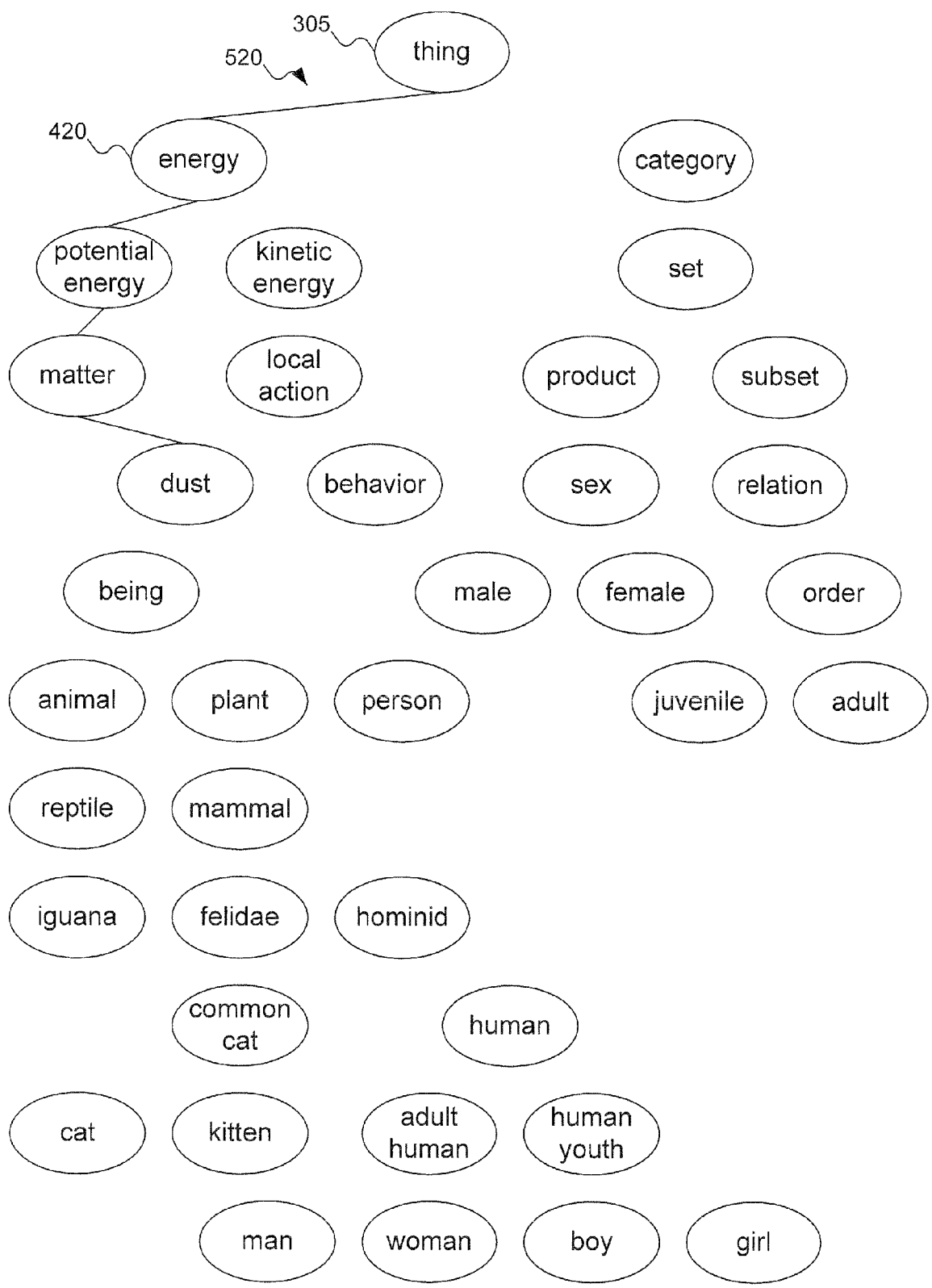
Figure 5E:
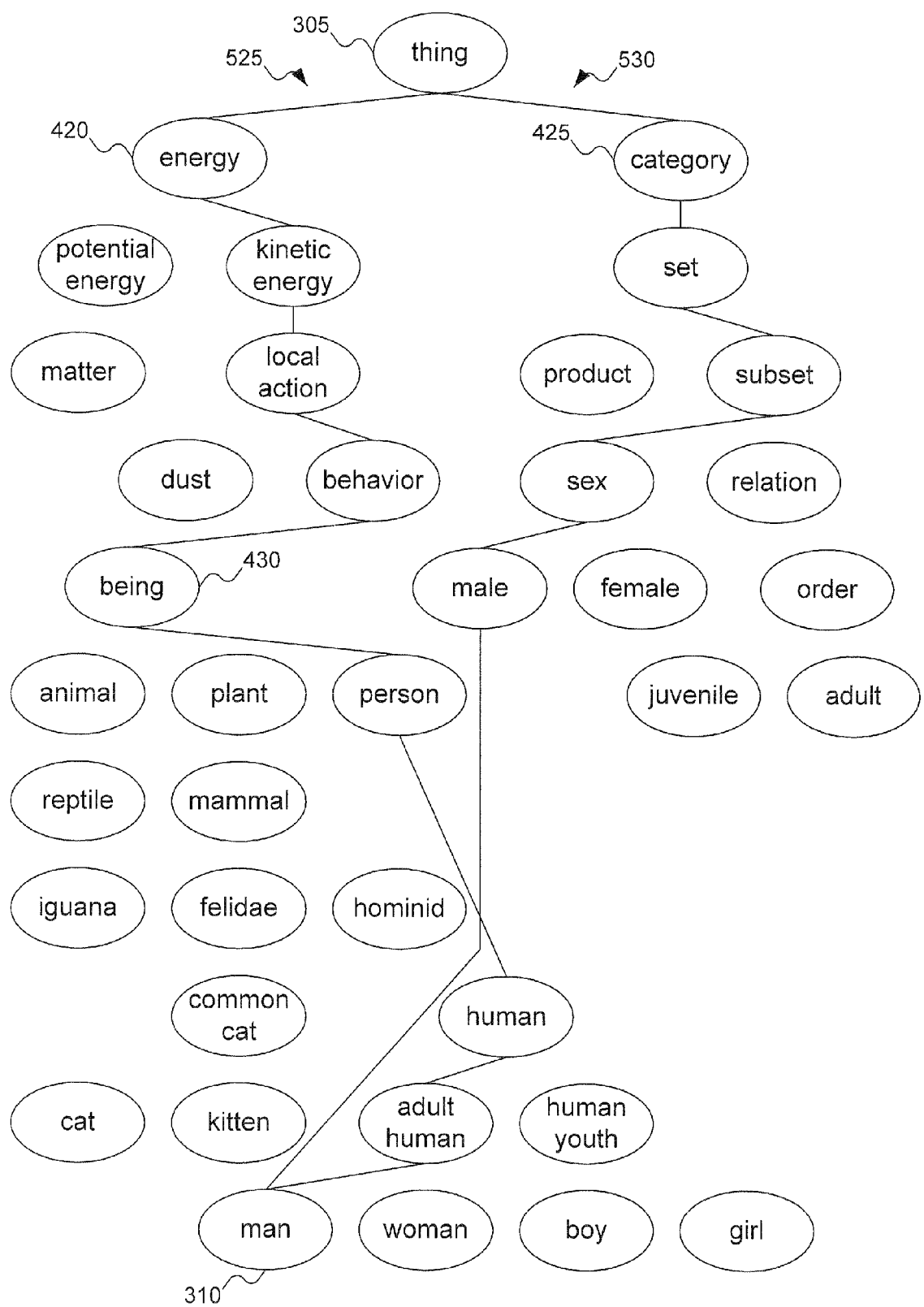
Figure 5F:
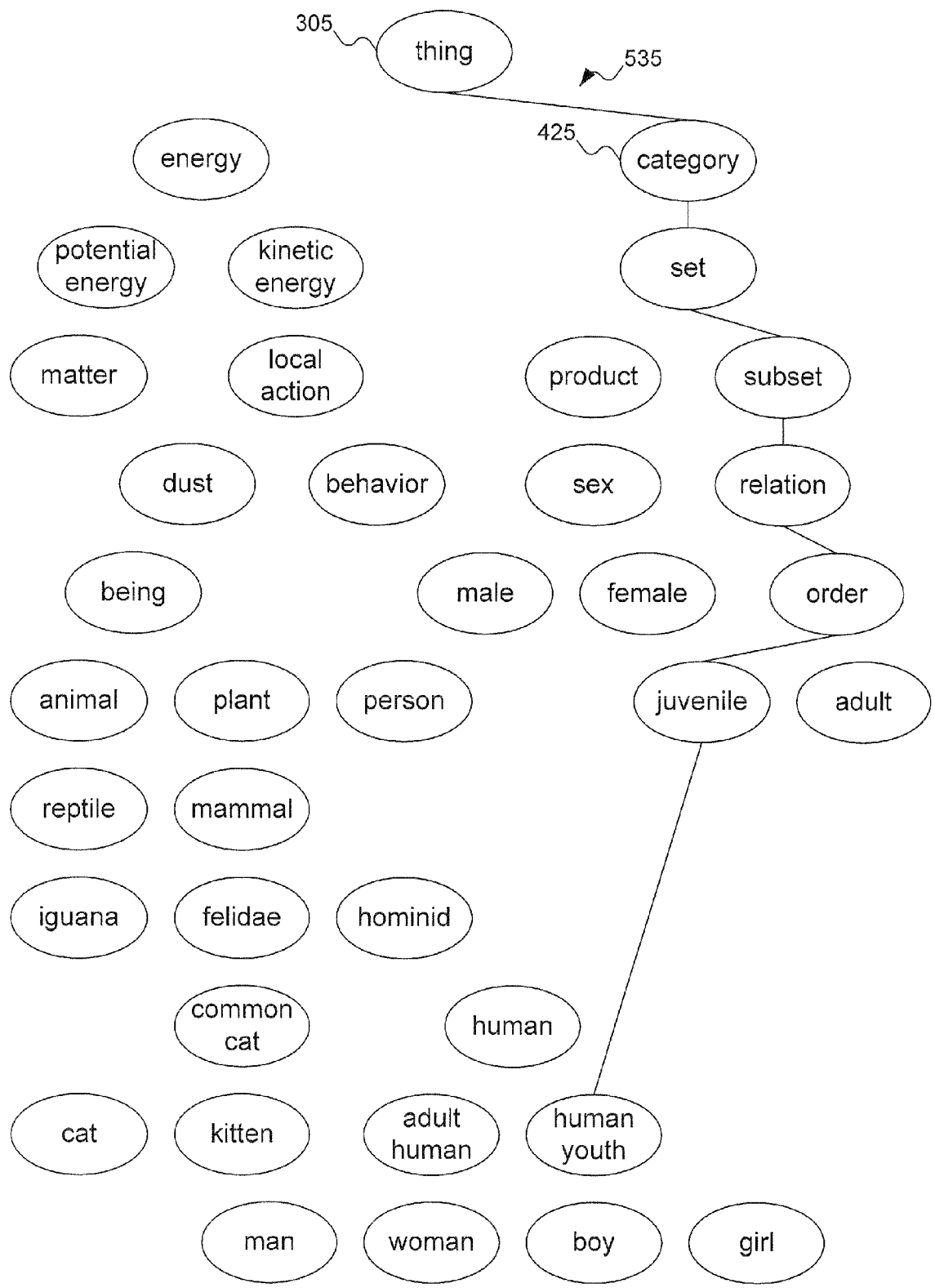
Figure 5G:
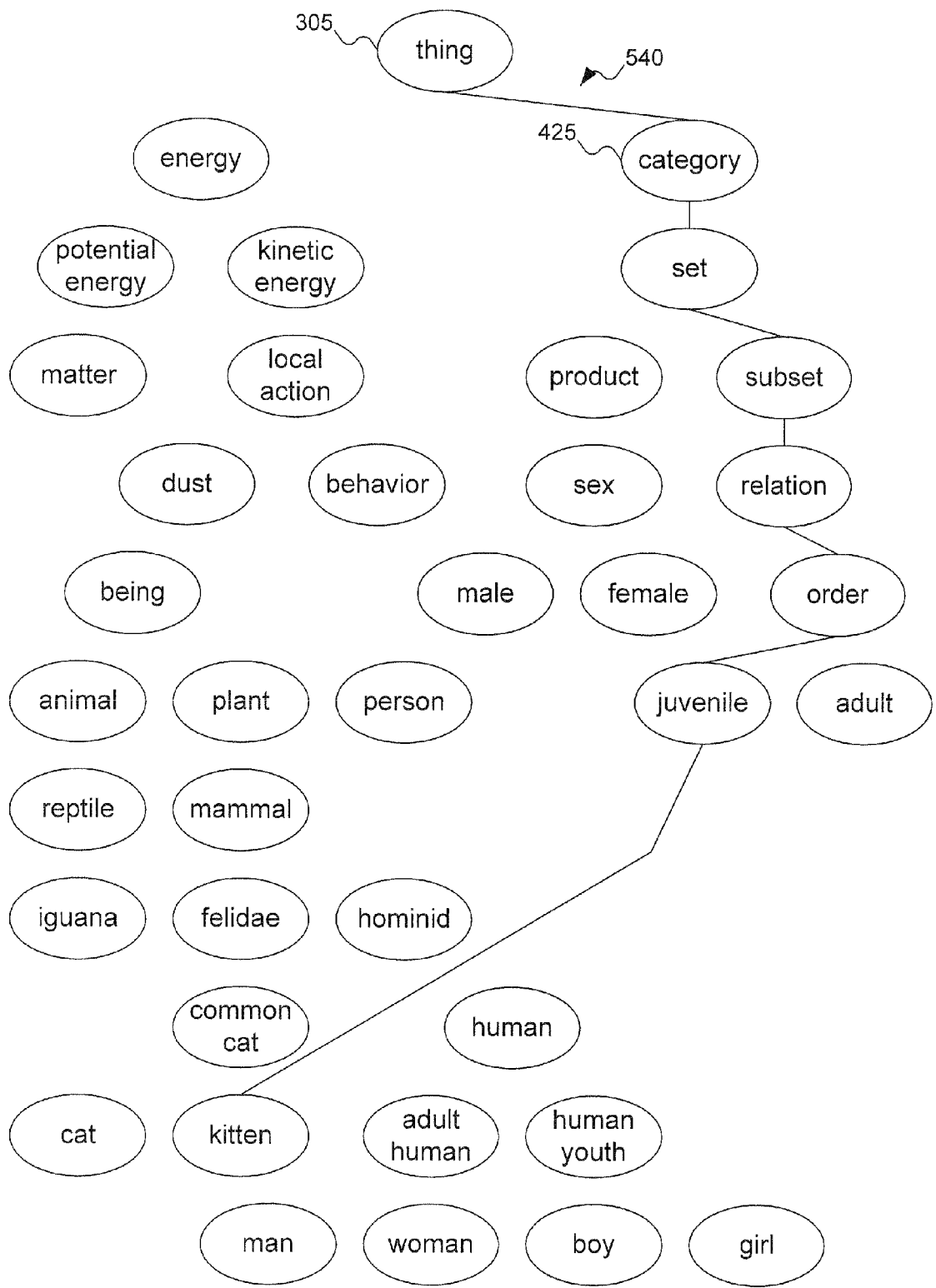

FIGS. 5A-5G show eight different chains in the directed set that form a basis for the directed set. FIG. 5A shows chain 505, which extends to concept "man" 310 through concept "energy" 420. FIG. 5B shows chain 510 extending to concept "iguana." FIG. 5C shows another chain 515 extending to concept "man" 310 via a different path. FIGS. 5D-5G show other chains.

Figure 13:
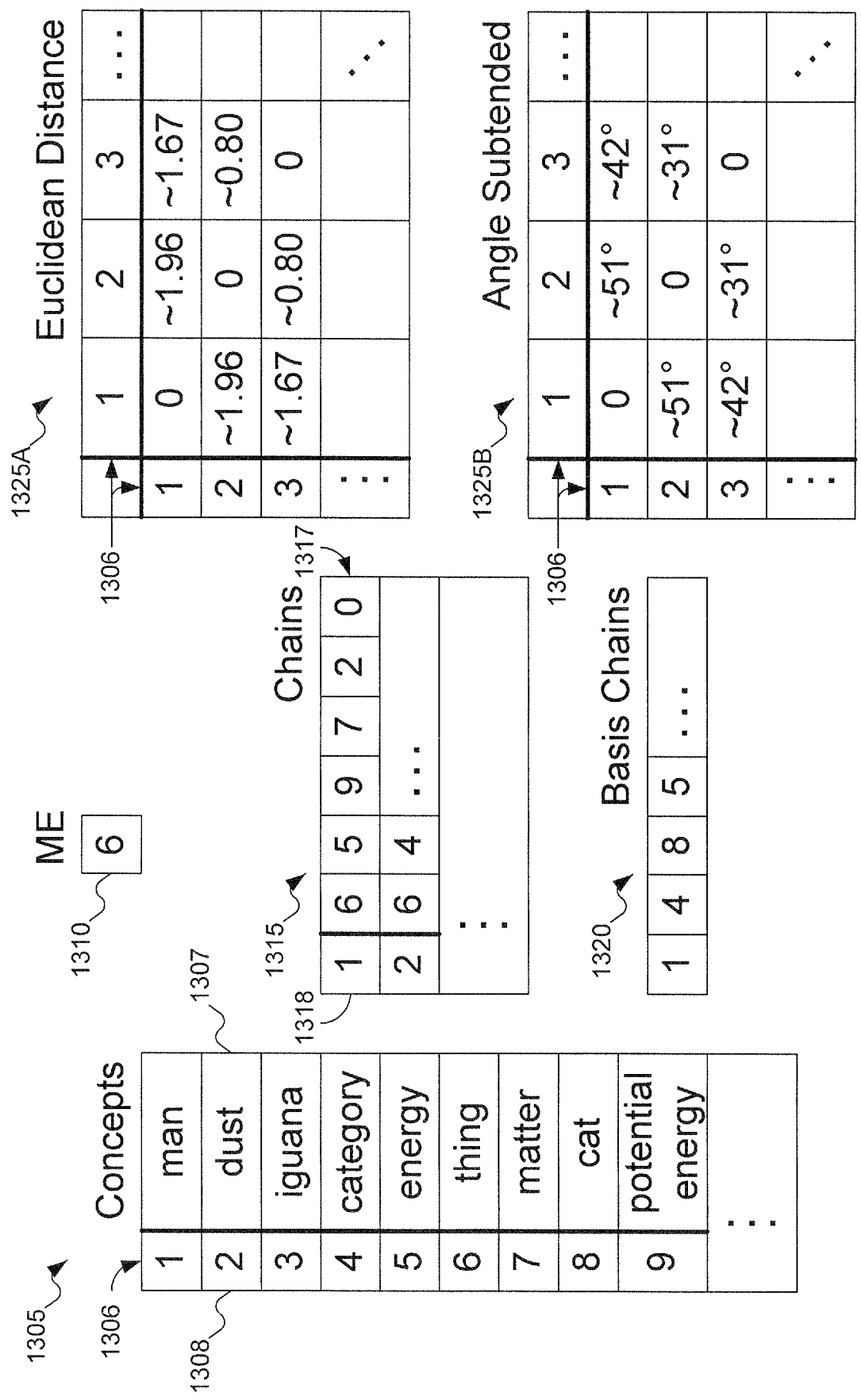
FIG. 13 shows data structures for storing a directed set, chains, and basis chains, such as the directed set of FIG. 3, the chains of FIG. 4, and the basis chains of FIGS. 5A-5G.

FIG. 13 shows a data structure for storing the directed set of FIG. 3, the chains of FIG. 4, and the basis chains of FIGS. 5A-5G. In FIG. 13, concepts array 1305 is used to store the concepts in the directed set. Concepts array 1305 stores pairs of elements. One element identifies concepts by name; the other element stores numerical identifiers 1306. For example, concept name 1307 stores the concept "dust," which is paired with numerical identifier "2" 1308. Concepts array 1305 shows 9 pairs of elements, but there is no theoretical limit to the number of concepts in concepts array 1305. In concepts array 1305, there should be no duplicated numerical identifiers 1306. In FIG. 13, concepts array 1305 is shown sorted by numerical identifier 1306, although this is not required. When concepts array 1305 is sorted by numerical identifier 1306, numerical identifier 1306 can be called the index of the concept name.

Maximal element (ME) 1310 stores the index to the maximal element in the directed set. In FIG. 13, the concept index to maximal element 1310 is "6," which corresponds to concept "thing," the maximal element of the directed set of FIG. 4.

Chains array 1315 is used to store the chains of the directed set. Chains array 1315 stores pairs of elements. One element identifies the concepts in a chain by index; the other element stores a numerical identifier. For example, chain 1317 stores a chain of concept indices "6", "5", "9", "7", and "2," and is indexed by chain index "1" (1318). (Concept index 0, which does not occur in concepts array 1305, can be used in chains array 1315 to indicate the end of the chain. Additionally, although chain 1317 includes five concepts, the number of concepts in each chain can vary.) Using the indices of concepts array 1305, this chain corresponds to concepts "thing," "energy," "potential energy," "matter," and "dust." Chains array 1315 shows one complete chain and part of a second chain, but there is no theoretical limit to the number of chains stored in chain array 1315. Observe that, because maximal element 1310 stores the concept index "6," every chain in chains array 1315 should begin with concept index "6." Ordering the concepts within a chain is ultimately helpful in measuring distances between the concepts. However concept order is not required. Further, there is no required order to the chains as they are stored in chains array 1315.

Basis chains array 1320 is used to store the chains of chains array 1315 that form a basis of the directed set. Basis chains array 1320 stores chain indices into chains array 1315. Basis chains array 1320 shows four chains in the basis (chains 1, 4, 8, and 5), but there is no theoretical limit to the number of chains in the basis for the directed set.

Euclidean distance matrix 1325A stores the distances between pairs of concepts in the directed set of FIG. 4. (How distance is measured between pairs of concepts in the directed set is discussed below. But in short, the concepts in the directed set are mapped to state vectors in multi-dimensional space, where a state vector is a directed line segment starting at the origin of the multi-dimensional space and extending to a point in the multi-dimensional space.) The distance between the end points of pairs of state vectors representing concepts is measured. The smaller the distance is between the state vectors representing the concepts, the more closely related the concepts are. Euclidean distance matrix 1325A uses the indices 1306 of the concepts array for the row and column indices of the matrix. For a given pair of row and column indices into Euclidean distance matrix 1325A, the entry at the intersection of that row and column in Euclidean distance matrix 1325A shows the distance between the concepts with the row and column concept indices, respectively. So, for example, the distance between concepts "man" and "dust" can be found at the intersection of row 1 and column 2 of Euclidean distance matrix 1325A as approximately 1.96 units. The distance between concepts "man" and "iguana" is approximately 1.67, which suggests that "man" is closer to "iguana" than "man" is to "dust." Observe that Euclidean distance matrix 1325A is symmetrical: that is, for an entry in Euclidean distance matrix 1325A with given row and column indices, the row and column indices can be swapped, and Euclidean distance matrix 1325A will yield the same value. In words, this means that the distance between two concepts is not dependent on concept order: the distance from concept "man" to concept "dust" is the same as the distance from concept "dust" to concept "man."

Angle subtended matrix 1325B is an alternative way to store the distance between pairs of concepts. Instead of measuring the distance between the state vectors representing the concepts (see below), the angle between the state vectors representing the concepts is measured. This angle will vary between 0 and 90 degrees. The narrower the angle is between the state vectors representing the concepts, the more closely related the concepts are. As with Euclidean distance matrix 1325A, angle subtended matrix 1325B uses the indices 1306 of the concepts array for the row and column indices of the matrix. For a given pair of row and column indices into angle subtended matrix 1325B, the entry at the intersection of that row and column in angle subtended matrix 1325B shows the angle subtended the state vectors for the concepts with the row and column concept indices, respectively. For example, the angle between concepts "man" and "dust" is approximately 51 degrees, whereas the angle between concepts "man" and "iguana" is approximately 42 degrees. This suggests that "man" is closer to "iguana" than "man" is to "dust." As with Euclidean distance matrix 1325A, angle subtended matrix 1325B is symmetrical.

Not shown in FIG. 13 is a data structure component for storing state vectors (discussed below). As state vectors are used in calculating the distances between pairs of concepts, if the directed set is static (i.e., concepts are not being added or removed and basis chains remain unchanged), the state vectors are not required after distances are calculated. Retaining the state vectors is useful, however, when the directed set is dynamic. A person skilled in the art will recognize how to add state vectors to the data structure of FIG. 13.

Although the data structure for concepts array 1305, maximal element 1310 chains array 1315, and basis chains array 1320 in FIG. 13 are shown as arrays, a person skilled in the art will recognize that other data structures are possible. For example, concepts array could store the concepts in a linked list, maximal element 1310 could use a pointer to point to the maximal element in concepts array 1305, chains array 1315 could use pointers to point to the elements in concepts array, and basis chains array 1320 could use pointers to point to chains in chains array 1315. Also, a person skilled in the art will recognize that the data in Euclidean distance matrix 1325A and angle subtended matrix 1325B can be stored using other data structures. For example, a symmetric matrix can be represented using only one half the space of a full matrix if only the entries below the main diagonal are preserved and the row index is always larger than the column index. Further space can be saved by computing the values of Euclidean distance matrix 1325A and angle subtended matrix 1325B "on the fly" as distances and angles are needed.

Returning to FIGS. 5A-5G, how are distances and angles subtended measured? The chains shown in FIGS. 5A-5G suggest that the relation between any node of the model and the maximal element "thing" 305 can be expressed as any one of a set of composite functions; one function for each chain from the minimal node $\mu$ to "thing" 305 (the $n^{th}$ predecessor of $\mu$ along the chain):

$$f: \mu \Rightarrow \text{thing} = f_1 \circ f_2 \circ f_3 \circ \ldots \circ f_n$$

where the chain connects n+1 concepts, and $f_j$: links the $(n-j)^{th}$ predecessor of $\mu$ with the $(n+1-j)^{th}$ predecessor of $\mu$, $1 \leq j \leq n$. For example, with reference to FIG. 5A, chain 505 connects nine concepts. For chain 505, $f_1$ is link 505A, $f_2$ is link 505B, and so on through $f_8$ being link 505H.

Consider the set of all such functions for all minimal nodes. Choose a countable subset $\{f_k\}$ of functions from the set. For each $f_k$ construct a function $g_k: S \Rightarrow I^1$ as follows. For s∈S, S is in relation (under hyponymy) to "thing" 305. Therefore, s is in relation to at least one predecessor of $\mu$, the minimal element of the (unique) chain associated with $f_k$. Then there is a predecessor of smallest index (of $\mu$), say the $m^{th}$, that is in relation to s. Define:

$$g_k(s) = (n-m)/n \qquad \text{Equation (2)}$$

This formula gives a measure of concreteness of a concept to a given chain associated with function $f_k$.

As an example of the definition of $g_k$, consider chain 505 of FIG. 5A, for which n is 8. Consider the concept "cat" 555. The smallest predecessor of "man" 310 that is in relation to "cat"

555 is "being" 430. Since "being" 430 is the fourth predecessor of "man" 310, m is 4, and $g_k$("cat" 555)=(8−4)/8=½−. "Iguana" 560 and "plant" 560 similarly have $g_k$ values of ½. But the only predecessor of "man" 310 that is in relation to "adult" 445 is "thing" 305 (which is the eighth predecessor of "man" 310), so m is 8, and $g_k$("adult" 445)=0.

Finally, define the vector valued function $\phi: S \Rightarrow R^k$ relative to the indexed set of scalar functions $\{g_1, g_2, g_3, \ldots, g_k\}$ (where scalar functions $\{g_1, g_2, g_3, \ldots, g_k\}$ are defined according to Equation (2)) as follows:

$$\phi(s) = <g_1(s), g_2(s), g_3(s), \ldots, g_k(s)>$$ Equation (3)

This state vector p(s) maps a concept s in the directed set to a point in k-space ($R^k$). One can measure distances between the points (the state vectors) in k-space. These distances provide measures of the closeness of concepts within the directed set. The means by which distance can be measured include distance functions, such as Equations (1a), (1b), or (1c). Further, trigonometry dictates that the distance between two vectors is related to the angle subtended between the two vectors, so means that measure the angle between the state vectors also approximates the distance between the state vectors. Finally, since only the direction (and not the magnitude) of the state vectors is important, the state vectors can be normalized to the unit sphere. If the state vectors are normalized, then the angle between two state vectors is no longer an approximation of the distance between the two state vectors, but rather is an exact measure.

The functions $g_k$ are analogous to step functions, and in the limit (of refinements of the topology) the functions are continuous. Continuous functions preserve local topology; i.e., "close things" in S map to "close things" in $R^k$, and "far things" in S tend to map to "far things" in $R^k$.

Example Results

The following example results show state vectors $\phi(s)$ using chain 505 as function $g_1$, chain 510 as function $g_2$, and so on through chain 540 as function $g_8$.

$\phi$("boy") $\Rightarrow$ <¾, 5/7, ⅘, ¾, 7/9, ⅚, 1, 6/7>
$\phi$("dust") $\Rightarrow$ <⅜, 3/7, 3/10, 1, ⅑, 0, 0, 0>
$\phi$("iguana") $\Rightarrow$ <½, 1, ½, ¾, 5/9, 0, 0, 0>
$\phi$("woman") $\Rightarrow$ <⅞, 5/7, 9/10, ¾, ⅝, ⅔, 5/7, 5/7>
$\phi$("man") $\Rightarrow$ <1, 5/7, 1, ¾, 1, 1, 5/7, 5/7>

Using these state vectors, the distances between concepts and the angles subtended between the state vectors are as follows:

| Pairs of Concepts | Distance (Euclidean) | Angle Subtended |
|---|---|---|
| "boy" and "dust" | ~1.85 | ~52° |
| "boy" and "iguana" | ~1.65 | ~46° |
| "boy" and "woman" | ~0.41 | ~10° |
| "dust" and "iguana" | ~0.80 | ~30° |
| "dust" and "woman" | ~1.68 | ~48° |
| "iguana" and "woman" | ~1.40 | ~39° |
| "man" and "woman" | ~0.39 | ~07° |

From these results, the following comparisons can be seen:
"boy" is closer to "iguana" than to "dust."
"boy" is closer to "iguana" than "woman" is to "dust."
"boy" is much closer to "woman" than to "iguana" or "dust."
"dust" is further from "iguana" than "boy" to "woman" or "man" to "woman,"
"woman" is closer to "iguana" than to "dust."
"woman" is closer to "iguana" than "boy" is to "dust."
"man" is closer to "woman" than "boy" is to "woman."

All other tests done to date yield similar results. The technique works consistently well.

How It (Really) Works

As described above, construction of the $\phi$ transform is (very nearly) an algorithm. In effect, this describes a recipe for metrizing a lexicon—or for that matter, metrizing anything that can be modeled as a directed set—but does not address the issue of why it works. In other words, what's really going on here? To answer this question, one must look to the underlying mathematical principles.

First of all, what is the nature of S? Earlier, it was suggested that a propositional model of the lexicon has found favor with many linguists. For example, the lexical element "automobile" might be modeled as:

{automobile: is a machine,
 is a vehicle,
 has engine,
 has brakes,
 ...
 }

In principle, there might be infinitely many such properties, though practically speaking one might restrict the cardinality to $\aleph_0$ (countably infinite) in order to ensure that the properties are addressable. If one were disposed to do so, one might require that there be only finitely many properties associated with a lexical element. However, there is no compelling reason to require finiteness.

At any rate, one can see that "automobile" is simply an element of the power set of P, the set of all propositions; i.e., it is an element of the set of all subsets of P. The power set is denoted as $\wp(P)$. Note that the first two properties of the "automobile" example express "is a" relationships. By "is a" is meant entailment. Entailment means that, were one to intersect the properties of every element of $\wp(P)$ that is called, for example, "machine," then the intersection would contain a subset of properties common to anything (in $\wp(P)$) that one has, does, will or would have called "machine." Reliance on the existence of a "least" common subset of properties to define entailment has a hint of well ordering about it; and indeed it is true that the axiom of choice is relied on to define entailment.

For the moment, restrict the notion of meaning postulate to that of entailment. Let $B=\{b_\alpha\}$ be the set of elements of $\wp(\wp(P))$ that correspond to good meaning postulates; e.g., $b_m \in B$ is the set of all elements of $\wp(P)$ that entail "machine." By "good" is meant complete and consistent. "Complete" means non-exclusion of objects that should entail (some concept). "Consistent" means exclusion of objects that should not entail (any concept). Should/should-not are understood to be negotiated between the community (of language users) and its individuals.

Note that if the intersection of $b_\beta$ and $b_\gamma$ is non-empty, then $b_\beta \cap b_\gamma$ is a "good" meaning postulate, and so must be in B. Define the set $S = \cup b_\alpha$ to be the lexicon. A point of S is an element of $\wp(P)$ that entails at least one meaning postulate.

B was deliberately constructed to be the basis of a topology $\tau$ for S. In other words, an open set in S is defined to be the union of elements of B. This is what is meant when one says that hyponymy is used to define the topology of the lexicon (in this particular embodiment).

The separability properties of S are reflected in the Genus/Species relationships of the unfolding inclusion chains. The $T_0$-$T_4$ trennungsaxioms are adopted. Now consider the set of bounded continuous real valued functions on S.

Urysohn's lemma. If S is a normal space and A and B are two disjoint closed subsets of S, then there is a real-valued continuous function g: $S \Rightarrow I^1$ of S into the unit interval $I^1$ such that g(A)=0 and g(B)=1.

The use of g to denote the function was not accidental; it should evoke the scalar coordinate functions $\{g_1, g_2, g_3, \ldots, g_k\}$ defined per Equation (2) above. A proof of the lemma can be found in almost any elementary general topology book.

The end is in sight! Before invoking a final theorem of Urysohn's and completing the metrication of S, the notion of a Hilbert coordinate space must be introduced.

Consider the set H of all sequences $\gamma = \{\gamma_1, \gamma_2, \gamma_3, \ldots\}$ such that $\tau^\infty$, $\gamma_i^2$ converges. Define the metric:

$$d(\gamma, \chi) = \left(\sum_{i=1}^{\infty} (\gamma_i - \chi_i)^2\right)^{1/2}$$

on the set H, and denote the Hilbert coordinate space (H, d).

If the sequence $\{\gamma_1, \gamma_2, \gamma_3, \ldots\}$ is considered as a vector, one can think of Hilbert space as a kind of "super" Euclidean space. Defining vector addition and scalar multiplication in the usual way, it is no great feat to show that the resultant vector is in H. Note that the standard inner product works just fine.

Before the metric space equivalent to the topological space (S, $\tau$) can be found, one last theorem is needed.

Theorem 2. A $T_1$-space S is regular if and only if for each point p in S and each open set U containing p, there is an open set V containing p whose closure $\overline{V}$ is contained in U.

In looking for a metric space equivalent to the topological space (S, $\tau$), Urysohn's lemma should be a strong hint to the reader that perhaps (H, d) should be considered.

Theorem 3. Every completely separable normal space S is homeomorphic to a subspace of Hilbert's coordinate space.

This theorem is proven by actually constructing the homeomorphism.

Proof: Let $B_1, B_2, \ldots B_n, \ldots$ be a countable basis for S. In view of Theorem 2, there are pairs $B_i$, $B_j$, such that $\overline{B_i}$ is contained in $B_j$; in fact, each point of point of S lies in infinitely many such pairs, or is itself an open set. However, there are at most a countable number of pairs for each point of S. For each such pair $B_i$ and $B_j$, Urysohn's lemma provides a function $g_n$ of S into $I^1$ with the property that $g_n(\overline{B_i})=0$ and $g_n(S-B_j)=1$. (If the point p forms an open set, then take $g_n=0$ for large n.) Letting H denote the Hilbert coordinate space, define the (vector-valued) mapping $\vartheta$ of S into H by setting $\vartheta(s) = \{g_1(s), g_2(s)/2, g_3(s)/3, \ldots, g_n(s)/n, \ldots\}$ for each point s in S. It remains to prove that the function $\vartheta$ so defined is continuous, one-to-one, and open.

The original proof (in its entirety) of Theorem 3 is available in the literature. When $\vartheta$ is applied to a lexicon with the entailment topology, it is herein called the Bohm transformation. Clearly, the finite-dimensional transform (P is an approximation of the Bohm transform, mapping the explicate order of the lexicon to a (shallow) implicate order in $R^k$.

Figure 6:
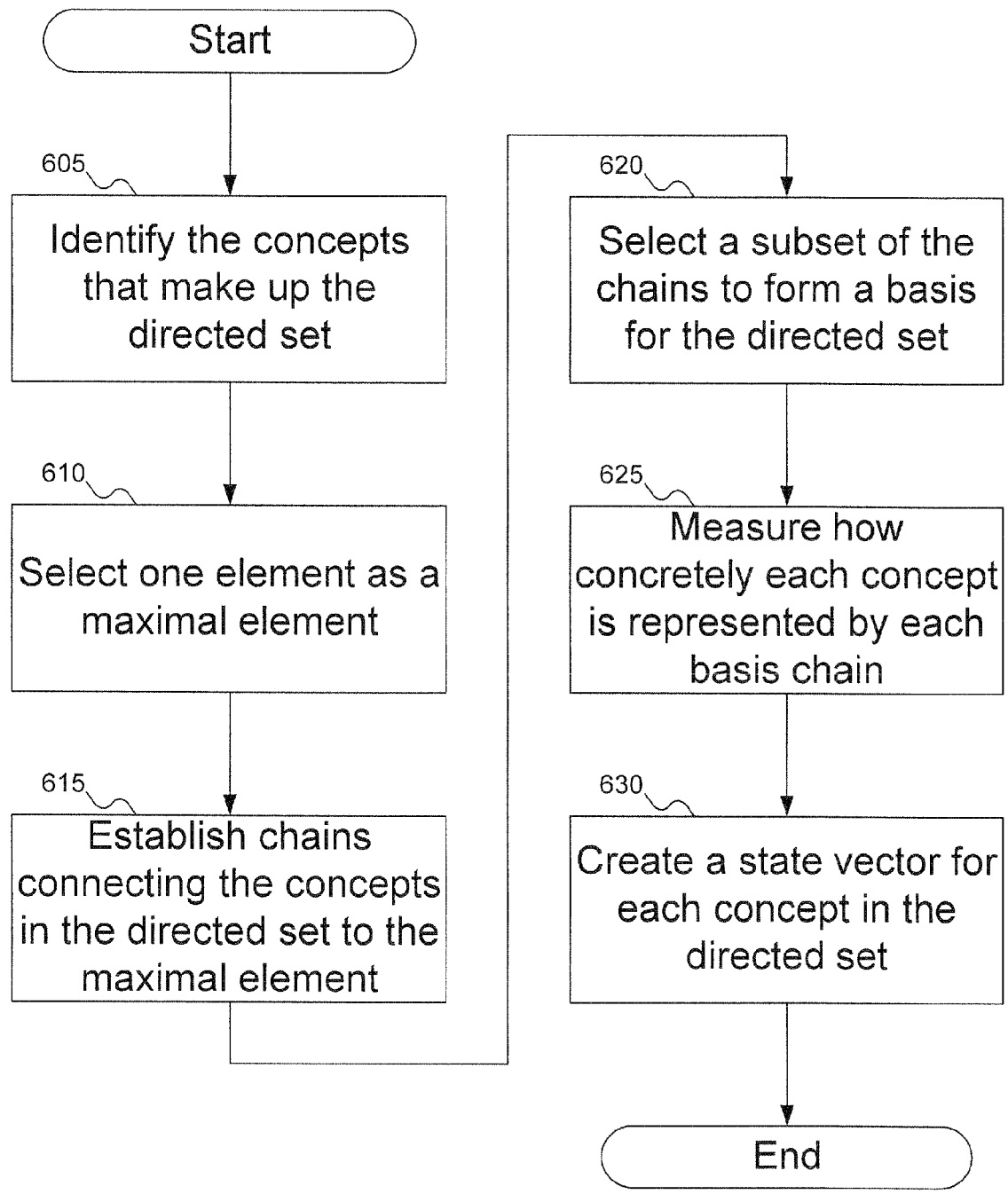
FIG. 6 is a flowchart of a method to construct a directed set in the system of FIG. 1A.

Now that the mathematical basis for constructing and using a lexicon has been presented, the process of constructing the lexical semantic space can be explained. FIG. 6 is a flowchart of the steps to construct a directed set. At step 605, the concepts that will form the basis for the semantic space are identified. These concepts can be determined according to a heuristic, or can be defined statically. At step 610, one concept is selected as the maximal element. At step 615, chains are established from the maximal element to each concept in the directed set. As noted earlier, there can be more than one chain from the maximal element to a concept: the directed set does not have to be a tree. Also, as discussed above, the chains represent a topology that allows the application of Uryshon's lemma to metrize the set: for example, hyponomy, meronomy, or any other relations that induce inclusion chains on the set. At step 620, a subset of the chains is selected to form a basis for the directed set. At step 625, each concept is measured to see how concretely each basis chain represents the concept. Finally, at step 630, a state vector is constructed for each concept, where the state vector includes as its coordinates the measurements of how concretely each basis chain represents the concept.

Figure 7:
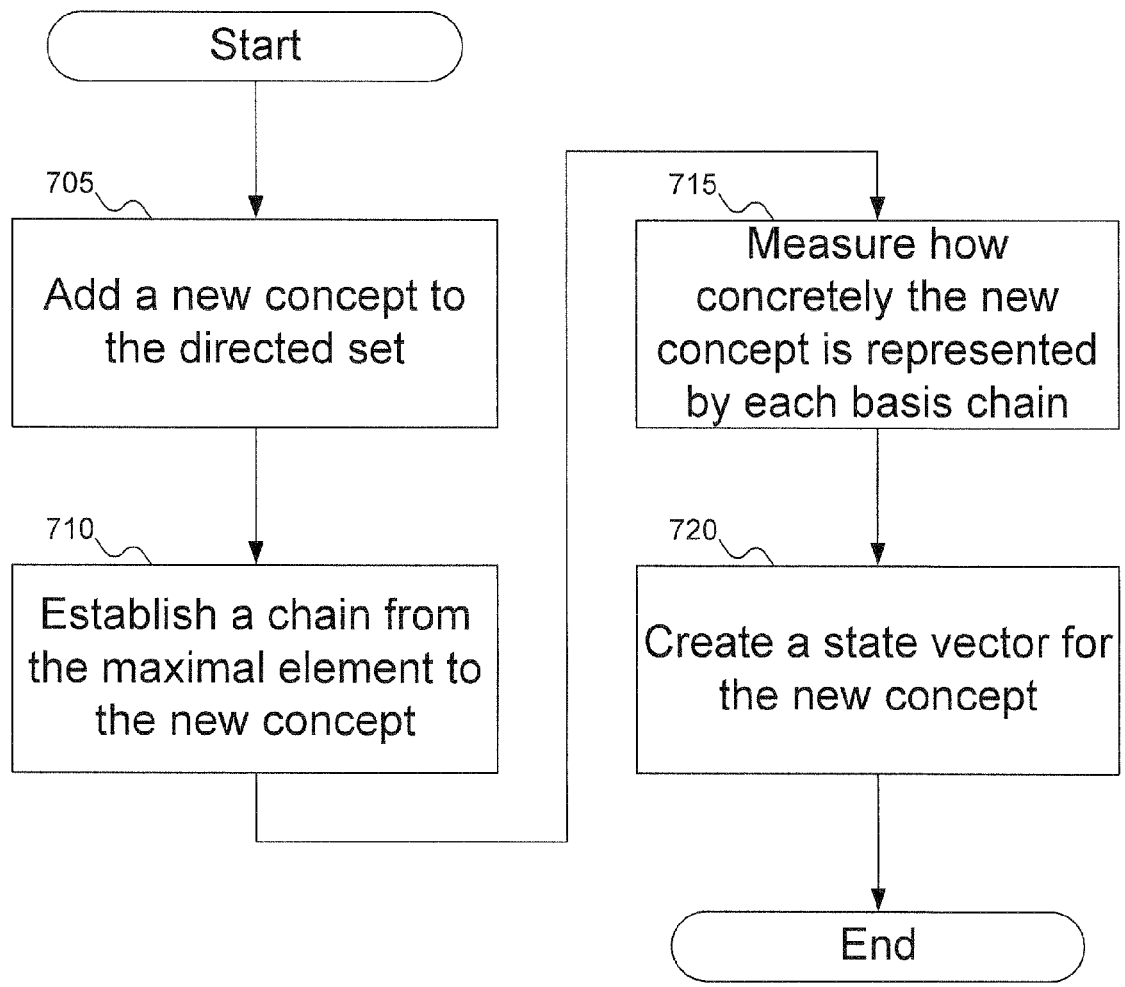
FIG. 7 is a flowchart of a method to add a new concept to a directed set in the system of FIG. 1A.

FIG. 7 is a flowchart of how to add a new concept to an existing directed set. At step 705, the new concept is added to the directed set. The new concept can be learned by any number of different means. For example, the administrator of the directed set can define the new concept. Alternatively, the new concept can be learned by listening to a content stream as shown in FIG. 2. A person skilled in the art will recognize that the new concept can be learned in other ways as well. The new concept can be a "leaf concept" or an "intermediate concept." Recall that an "intermediate concept" is one that is an abstraction of further concepts; a "leaf concept" is one that is not an abstraction of further concepts. For example, referring to FIG. 4, "man" 310 is a "leaf concept," but "adult human" 315 is an "intermediate concept. Returning to FIG. 7, at step 710, a chain is established from the maximal element to the new concept. Determining the appropriate chain to establish to the new concept can be done manually or based on properties of the new concept learned by the system. A person skilled in the art will also recognize that, as discussed above, more than one chain to the new concept can be established. At step 715, the new concept is measured to see how concretely each chain in the basis represents the new concept. Finally, at step 720, a state vector is created for the new concept, where the state vector includes as its coordinates the measurements of how concretely each basis chain represents the new concept.

Figure 8:
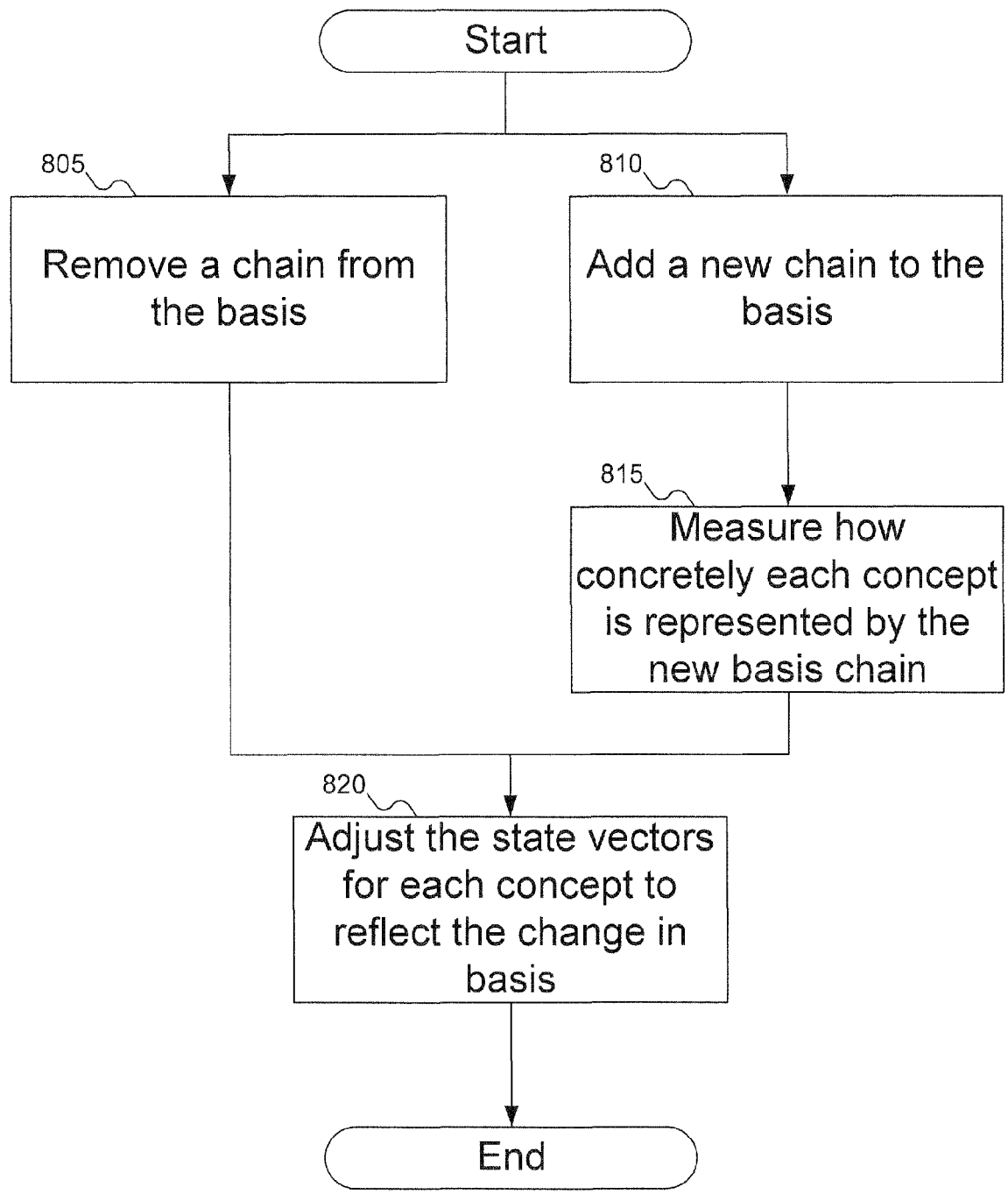
FIG. 8 is a flowchart of a method to update a basis for a directed set in the system of FIG. 1A.

FIG. 8 is a flowchart of how to update the basis, either by adding to or removing from the basis chains. If chains are to be removed from the basis, then at step 805 the chains to be removed are deleted. Otherwise, at step 810 new chains are added to the basis. If a new chain is added to the basis, each concept must be measured to see how concretely the new basis chain represents the concept (step 815). Finally, whether chains are being added to or removed from the basis, at step 820 the state vectors for each concept in the directed set are updated to reflect the change.

A person skilled in the art will recognize that, although FIG. 8 shows adding and removing basis chains to be separate operations, they can be done at the same time. In other words, one basis chain can be deleted and a new basis chain added at the same time.

Figure 9:
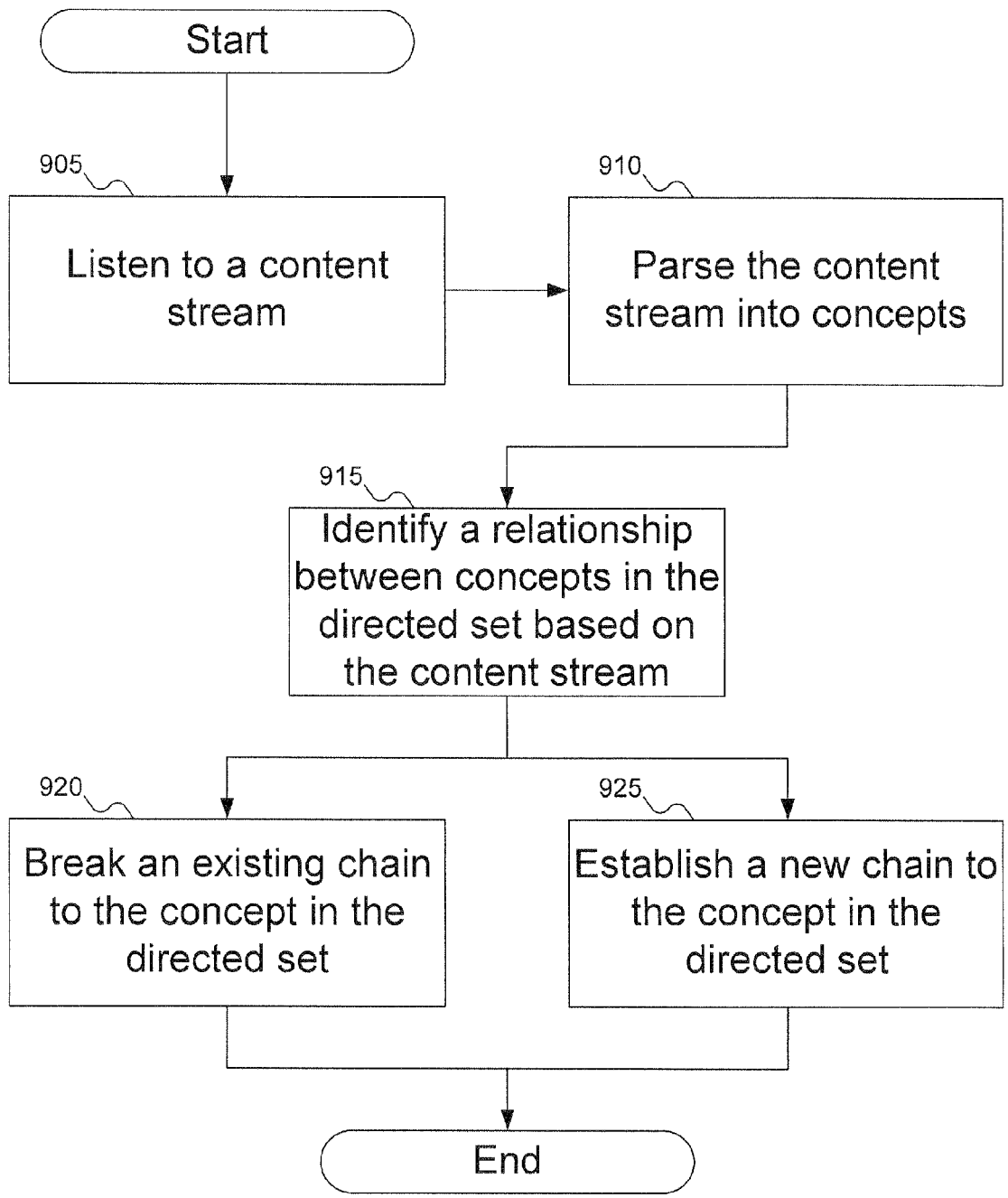
FIG. 9 is a flowchart of a method of updating the concepts in a directed set in the system of FIG. 1A.

FIG. 9 is a flowchart of how the directed set is updated. At step 905, the system is listening to a content stream. At step 910, the system parses the content stream into concepts. At step 915, the system identifies relationships between concepts in the directed set that are described by the content stream. Then, if the relationship identified at step 915 indicates that an existing chain is incorrect, at step 920 the existing chain is broken. Alternatively, if the relationship identified at step 915 indicates that a new chain is needed, at step 925 a new chain is established.

A person skilled in the art will recognize that, although FIG. 9 shows establishing new chains and breaking existing chains to be separate operations, they can be done at the same time. In other words, an identified relationship may require breaking an existing chain and establishing a new chain at the same time.

Figure 10A:
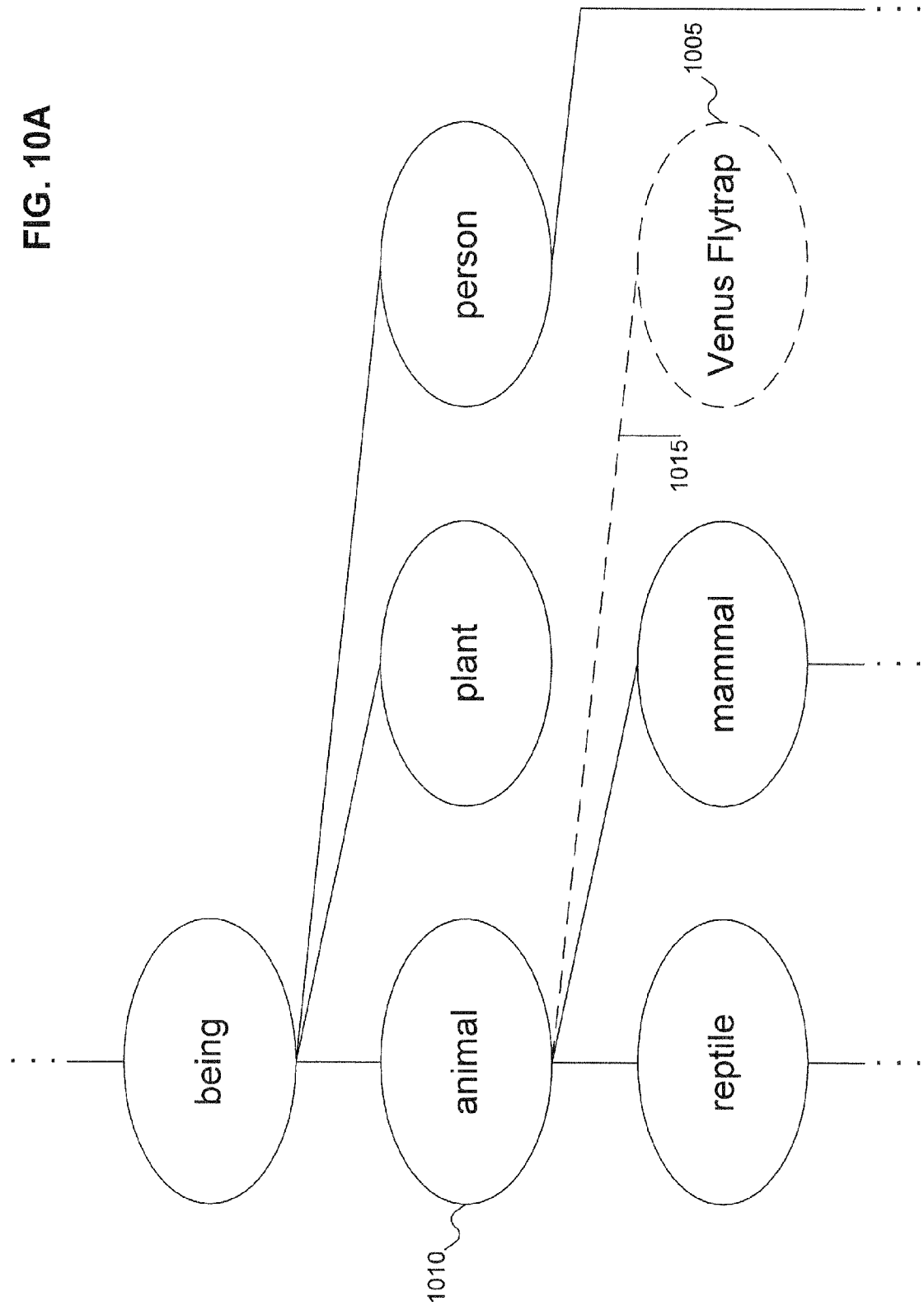
FIGS. 10A and 10B show how a new concept is added and relationships changed in the directed set of FIG. 4.
Figure 10B:
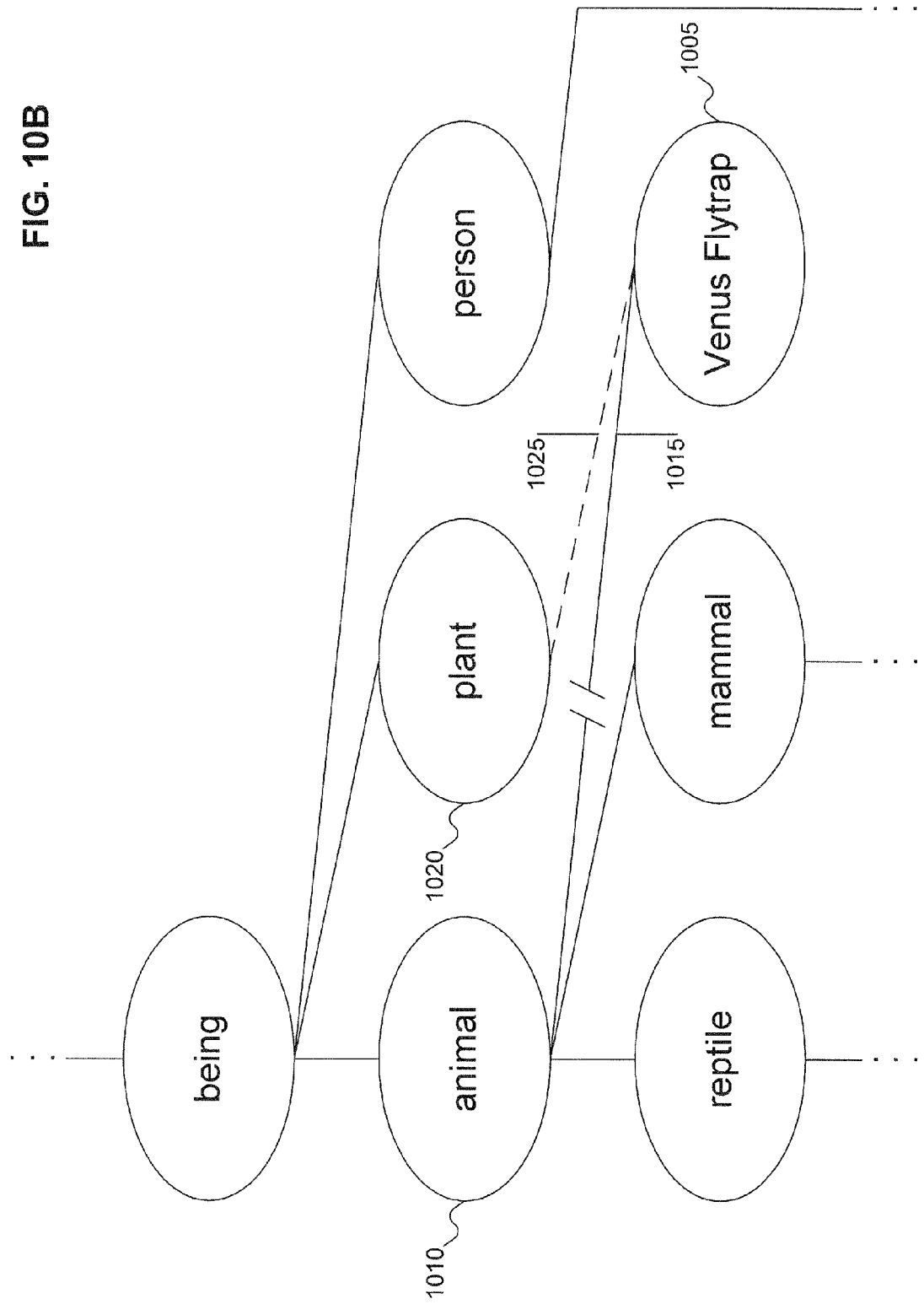

FIGS. 10A and 10B show how new concepts are added and relationships changed in the directed set of FIG. 4. FIGS. 10A and 10B show a close-up of a portion of the directed set of FIG. 4. FIG. 10A shows the state of the directed set after the system listens to the content stream 210 of FIG. 2. The terms "behavior," "female," "cat," "Venus Flytrap," and "iguana," are parsed from the content stream. For example, the stream may have included the question "How does the behavior of a female cat around a Venus Flytrap differ from that around an iguana?", from which the concepts were parsed. The term "Venus Flytrap" is unknown in the directed set, and a new concept "Venus Flytrap" 1005 is added to the directed set. The directed set may then conclude that, since "Venus Flytrap" is being compared to an "iguana," that "Venus Flytrap" is some type of animal, and should be related to "animal" 1010. (The directed set might even be more specific and conclude that "Venus Flytrap" is the same type of animal as "iguana," i.e., a reptile, but for this example a more general conclusion is assumed.) The directed set then introduces a chain 1015 through "animal" 1010 to "Venus Flytrap" 1005.

Assume that at this point, the directed set learns that a Venus Flytrap is some kind of plant, and not an animal. As shown in FIG. 10B, the directed set needs to establish a relationship between "Venus Flytrap" 1005 and "plant" 1020, and break the relationship with "animal" 1010. The directed set then breaks chain 1015 and adds chain 1025.

Figure 11:
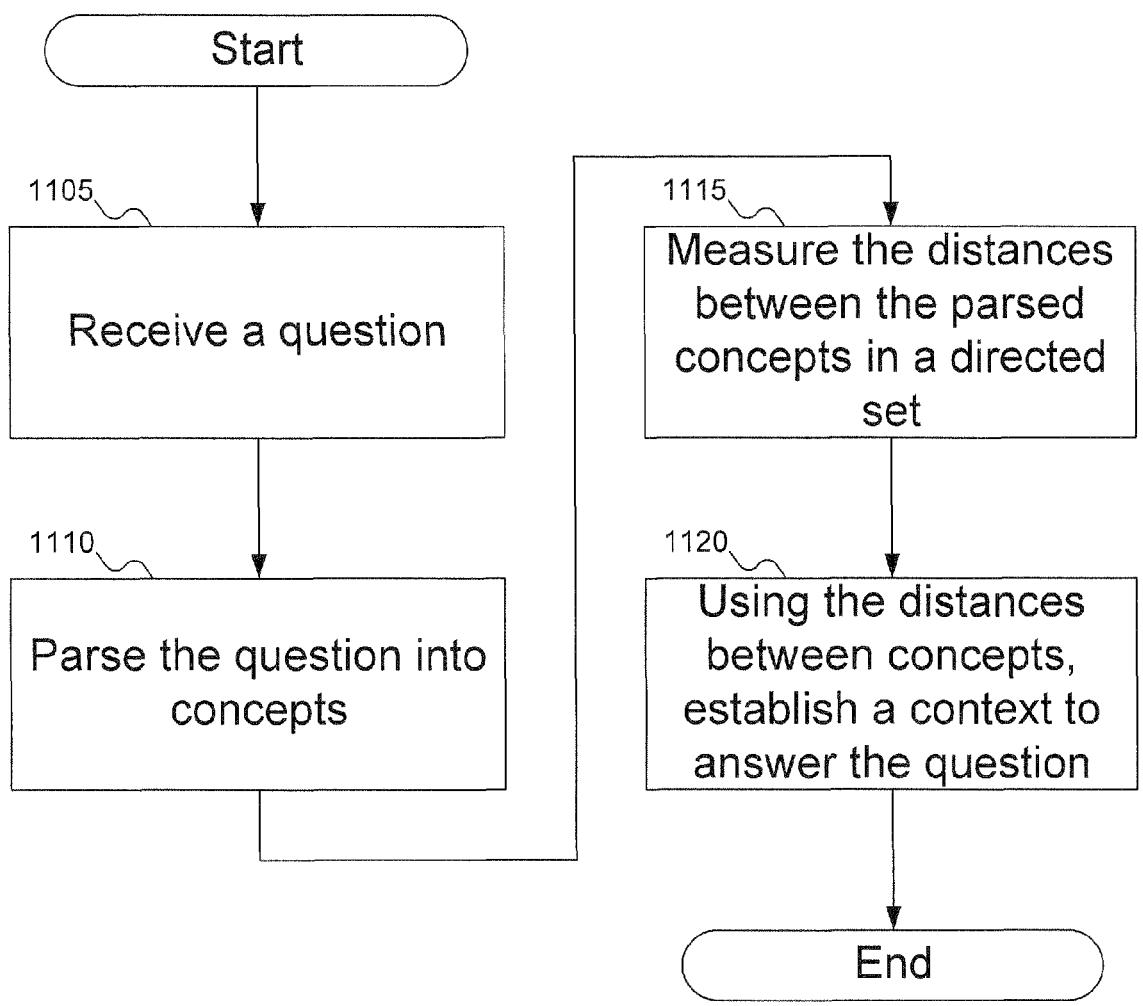
FIG. 11 is a flowchart of a method using a directed set in the system of FIG. 1A to help in answering a question.

FIG. 11 shows a flowchart of how a directed set can be used to help in answering a question. At step 1105, the system receives the question. At step 1110, the system parses the question into concepts. At step 1115, the distances between the parsed concepts are measured in a directed set. Finally, at step 1120, using the distances between the parsed concepts, a context is established in which to answer the question.

Figure 12:
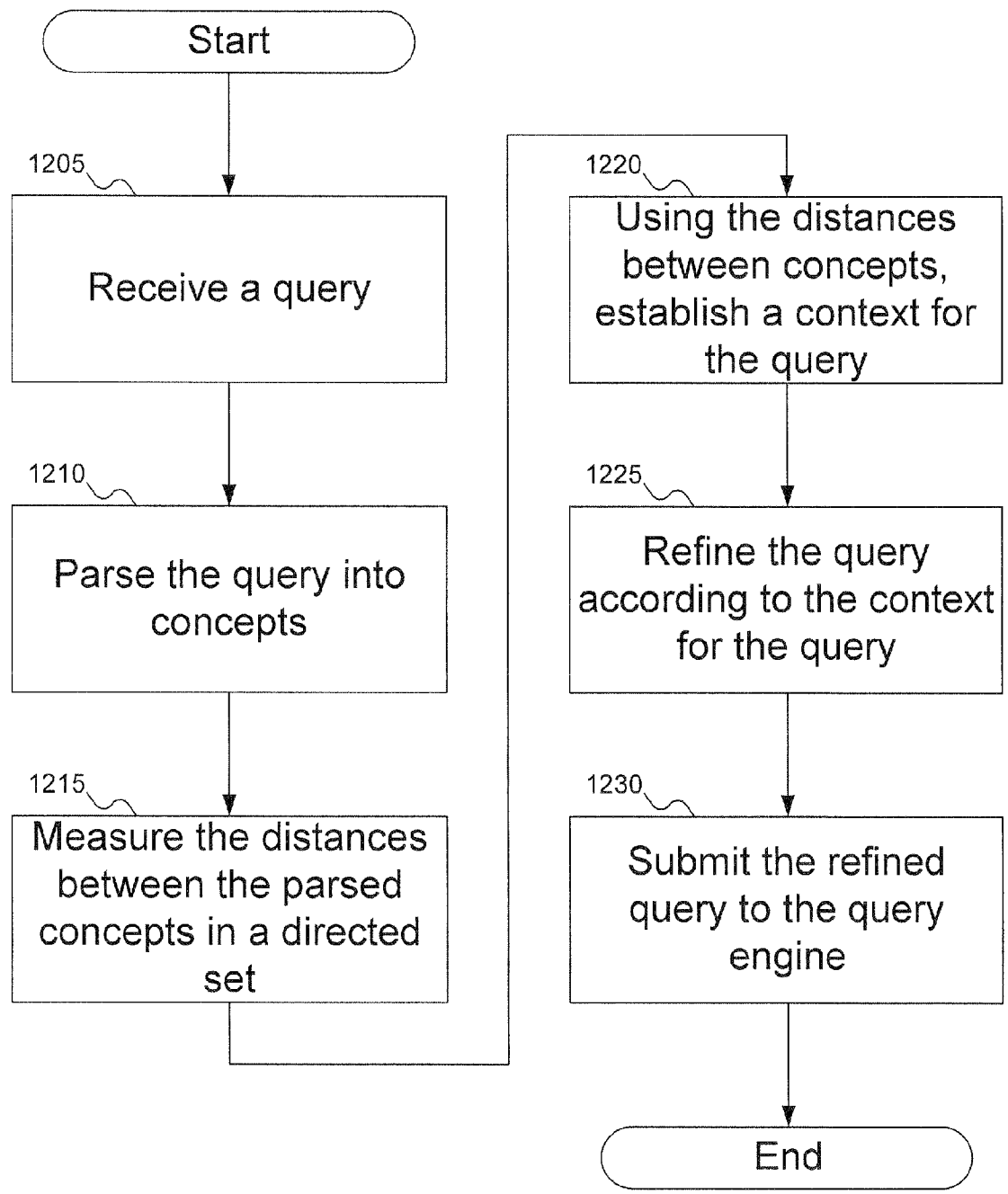
FIG. 12 is a flowchart of a method using a directed set in the system of FIG. 1A to refine a query.

FIG. 12 shows a flowchart of how a directed set can be used to refine a query, for example, to a database. At step 1205, the system receives the query. At step 1210, the system parses the query into concepts. At step 1215, the distances between the parsed concepts are measured in a directed set. At step 1220, using the distances between the parsed concepts, a context is established in which to refine the query. At step 1225, the query is refined according to the context. Finally, at step 1230, the refined query is submitted to the query engine.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for a user of a computer system to find a context to aid in answering a question, the method comprising:
   identifying a plurality of concepts to form a directed set, wherein one concept is a maximal element;
   establishing directed links between pairs of concepts in the directed set, the directed links defining "is a" relationships between the concepts in the pairs of concepts, so that each concept is either a source or a sink of at least one directed link;
   parsing the question into two or more parsed concepts;
   establishing one or more chains in the directed set, wherein each chain is rooted at the maximal element in the directed set and extends to a concept from the plurality of concepts in the directed set, and for each pair of concepts in each chain, one of the pair of concepts is a lineal ancestor of the other of the pair of concepts;
   creating a distance vector for the one or more parsed concepts in the directed set, wherein each distance vector includes as its components the measure of how concretely the concept is represented in each chain;
   measuring a distance between the distance vectors for each pair of parsed concepts; and
   using the distances between the one or more parsed concepts to establish a context for the question.

2. A method for using a lexicon to submit a refined query input by a user to a query engine, the refined query method comprising:
   identifying a plurality of concepts to form the lexicon, wherein one concept is a maximal element;
   establishing directed links between pairs of concepts in the lexicon, the directed links defining "is a" relationships between the concepts in the pairs of concepts, so that each concept is either a source or a sink of at least one directed link;
   parsing a query into one or more parsed concepts represented in the lexicon;
   establishing chains in the lexicon from the maximal element to each other concept, where for each pair of concepts in each chain, one of the pair of concepts is a lineal ancestor of the other of the pair of concepts;
   measuring how concretely each concept is represented in each chain;
   measuring distances in the lexicon between the one or more parsed concepts using how concretely each concept is represented in each chain;
   using the distances between the one or more parsed concepts to establish a context for the query;
   refining the query according to the context for the query; and
   submitting the refined query to the query engine.

* * * * *

UNITED STATES PATENT AND TRADEMARK OFFICE
CERTIFICATE OF CORRECTION

PATENT NO. : 8,131,741 B2  
APPLICATION NO. : 11/929678  
DATED : March 6, 2012  
INVENTOR(S) : Delos C. Jensen and Stephen R. Carter It is certified that error appears in the above-identified patent and that said Letters Patent is hereby corrected as shown below:

In the Specification

On column 4, line 38, the word "prepositionally" should read --propositionally--;
on column 5, line 1, the expression "(n: n E N, p: p E P)" should read --(n: n $\in$ N, p: p $\in$ P)--;
on column 5, line 4, the words "(is adult)" should read --(is ~adult)--;
on column 6, line 37, the expression "($\mathcal{H}$(S)" should read --$\mathcal{H}$(S)--;
on column 6, line 38, the expression "($\mathcal{H}$(S)" should read --$\mathcal{H}$(S)--;
on column 6, line 41, the expression "($\mathcal{H}$(S)" should read --$\mathcal{H}$(S)--;
on column 6, line 46, the expression "($\mathcal{H}$(S)" should read --$\mathcal{H}$(S)--;
on column 6, line 50, the expression "($\mathcal{H}$(S)" should read --$\mathcal{H}$(S)--;
on column 6, line 59, the expression "($\mathcal{H}$(S)" should read --$\mathcal{H}$(S)--;
on column 6, line 60, the expression "($\mathcal{H}$(S)" should read --$\mathcal{H}$(S)--;
on column 6, line 61, the expression "($\mathcal{H}$(S)" should read --$\mathcal{H}$(S)--;
on column 7, line 4, the word "n" should read --$\bar{n}$--;
on column 7, line 15, the symbol "$\tau$" should read --$\Sigma$--;
on column 7, line 29, the expression "22" should read --$2^{2^r}$--;
on column 11, line 13, the expression "p(s)" should read --$\varphi(s)$--;
on column 13, line 13, the symbol "$\tau^\infty$," should read --$\Sigma^\infty$--;

Signed and Sealed this  
Tenth Day of September, 2013

Teresa Stanek Rea  
*Acting Director of the United States Patent and Trademark Office*